United States Patent [19]
Omura et al.

[11] Patent Number: 5,552,986
[45] Date of Patent: Sep. 3, 1996

[54] PASSENGER RESTRAINT BELT SYSTEM

[75] Inventors: Hideo Omura, Yokosuka; Masaaki Kobayashi, Yokohama, both of Japan

[73] Assignee: Nissan Motor Co., Ltd., Yokohama, Japan

[21] Appl. No.: 218,633

[22] Filed: Mar. 28, 1994

[30] Foreign Application Priority Data

Mar. 31, 1993 [JP] Japan .................................. 5-073910

[51] Int. Cl.$^6$ .................................................. B60R 22/46
[52] U.S. Cl. .................... 364/424.05; 280/806; 280/807; 297/480; 180/268
[58] Field of Search .......................... 364/424.05, 461; 180/268, 271, 274; 280/801.1, 801.2, 802, 803, 804, 805, 806, 807, 808; 307/10.1; 297/468, 469, 470, 476, 479, 480

[56] References Cited

U.S. PATENT DOCUMENTS

| | | | |
|---|---|---|---|
| 3,918,545 | 11/1975 | Andres et al. | 180/268 |
| 4,968,059 | 11/1990 | Motozawa et al. | 280/806 |
| 5,076,608 | 12/1991 | Shimose | 280/807 |
| 5,186,494 | 2/1993 | Shimose | 180/268 |
| 5,338,063 | 8/1994 | Takeuchi et al. | 280/806 |
| 5,398,185 | 3/1995 | Omura | 364/424.05 |
| 5,415,431 | 5/1995 | Omura | 280/805 |

FOREIGN PATENT DOCUMENTS

| | | |
|---|---|---|
| 2227121 | 1/1974 | Germany . |
| 4112579 | 10/1991 | Germany . |

*Primary Examiner*—Gary Chin
*Attorney, Agent, or Firm*—Foley & Lardner

[57] ABSTRACT

A passenger restraint belt system for use with a seat installed in a conveyance. The system comprises a seat belt for restraining a passenger on the seat in a first restraint position. The seat belt is driven by first and second preloader mechanisms. The first preloader mechanism operates to retract the seat belt from the first restraint position to a second restraint position where a first degree of tension is exerted on the seat belt so as to restrain the seat passenger while allowing passenger's operations to avoid a vehicle collision when the vehicle collision is anticipated. The second preloader mechanism operates to retract the seat belt from the second restraint position to a third restraint position where a second, greater degree of tension is exerted on the seat belt so as to restrain the seat passenger against impacts caused by a vehicle collision when the vehicle collision is detected.

19 Claims, 27 Drawing Sheets

TO MICROCOMPUTER

PASSENGER RESTRAINT BELT SYSTEM

BACKGROUND OF THE INVENTION

This invention relates to a passenger restraint belt system for use with vehicles, ships, airplanes and other conveyances.

For example, Japanese Utility Model Publication No. 2-7094 discloses a vehicle occupant restraint belt system which includes an emergency lock retractor (ELR) as shown in FIG. 26. The emergency lock retractor has a shaft 102 around which a seat belt 103 is looped. The shaft 102 is drivingly connected to an electric motor 109 operable on command from a control unit to rotate the shaft 102 in a normal direction retracting the seat belt 2 into the retractor and in a reverse direction pulling the seat belt 2 out of the retractor. The emergency lock retractor is associated with an emergency lock mechanism 104.

Referring to FIG. 27, the control unit includes a slack setting circuit 124 connected to a brake switch 116, a vehicle speed sensor 117 and an accelerator switch 116. The brake switch 116 is associated with the brake pedal and it produces a signal indicative of the application of braking to the vehicle. The vehicle speed sensor 117 is provided to sense the speed of running of the vehicle and it produces a brake application signal indicative of the sensed vehicle speed. The accelerator switch 116 is associated with the accelerator pedal and it produces a deceleration signal when the accelerator pedal is released. The slack setting circuit 124 operates in response to the signals from the brake switch 116, the vehicle speed sensor 117 and the accelerator switch 118 to calculate a desired degree of slack to be produced in the seat belt 103. The desired slack degree is fed from the slack setting circuit 124 to a control circuit 127 which thereby controls the first and second relays 128 and 129 to operate the electric motor 109 in the normal or reverse direction so as to adjust the slack in the seat belt 103 to the desired degree calculated by the slack setting circuit 124. The produced belt slack is effective to provide a tensionless condition where a predetermined degree of margin exists around the seat passenger when the seat belt is in passenger restraining position. The control unit controls the retractor to retain the tensionless condition when the vehicle is running at a very slow speed or at rest, and to eliminate the slack in the seat belt 103 in the presence of vehicle braking when the vehicle is running at a slow speed or in the presence of vehicle deceleration when the vehicle is running at a fast speed. The control unit locks the retractor with no slack in the seat belt 103 when a vehicle collision is anticipated based on brake- and accelerator-pedal operations. The control unit can provide a great degree of slack in the seat belt 103 in normal vehicle driving conditions.

Referring to FIG. 28, description will be made to another vehicle occupant restraint belt system disclosed in Japanese Patent Application No. 2-100218. This vehicle occupant restraint belt system includes interior elements CL1 mounted to the vehicle body. Each of the interior elements CL1 is associated with corresponding one of actuators included in the driving means CL2 and it has a state variable with respect to the passenger. The vehicle occupant restraint belt system also includes a detecting means CL3 for collecting vehicle collision data. The collected vehicle collision data are fed to a behavior estimating means CL4 which estimates a passenger's behavior based on the vehicle collision data including an impact to the passenger. The collected vehicle collision data are also fed to a computing means CL5 which receives the estimated passenger's behavior from the behavior estimating means CL4. The computing means CL5 calculates characteristic values of the respective interior elements in a manner to minimize the impact to the passenger in accordance with the estimated behavior. The calculated characteristic values are fed to a control means CL6 which thereby controls the respective actuators CL2 for driving the corresponding interior elements CL1.

Referring to FIGS. 29A and 29B, the detecting means CL3 is taken in the form of a laser radar 169 used to detect the speed of the vehicle relative to the one in front just before a vehicle collision. The behavior estimating means CL4 and the computing means CL5 calculate an optimum seat belt load varying characteristic based on the detected relative speed. The control means CL6 controls the corresponding actuator included in the driving means CL2 to realize the calculated optimum seat belt load varying characteristic. The actuator is taken in the form of a combination of an adjustable load clamp 133 provided in the emergency lock retractor 131 and a preloader 135.

Referring to FIG. 30, there is shown still another vehicle occupant restraint belt system which employs a preloader type emergency lock retractor operable in response to the G waveform transmitted from the vehicle body. With such a conventional vehicle occupant restraint belt system, however, the length or stroke the seat belt is retracted is limited by the length of sliding movement of the piston 141 within the cylinder 139. For this reason, the belt retracting stroke cannot be increased without increasing the size of the retractor.

SUMMARY OF THE INVENTION

It is a main object of the invention to provide an inexpensive passenger restraint belt system which can provide an optimum seat passenger restraining condition when a collision is anticipated.

There is provided, in accordance with the invention, a passenger restraint belt system for use with a seat installed in a conveyance. The passenger restraint belt system comprises a seat belt for restraining a passenger on the seat in a first restraint position, a first preloader mechanism responsive to a first command signal for retracting the seat belt from the first restraint position to a second restraint position where a first degree of tension is exerted on the seat belt so as to restrain the seat passenger while allowing passenger's operations to avoid a vehicle collision, and a second preloader mechanism responsive to a second command signal for retracting the seat belt from the second restraint position to a third restraint position where a second, greater degree of tension is exerted on the seat belt so as to restrain the seat passenger against impacts caused by a vehicle collision. A control unit is provided for producing the first command signal to the first preloader mechanism when the vehicle collision is anticipated and the second command signal to the second preloader mechanism when the vehicle collision is detected.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1A:
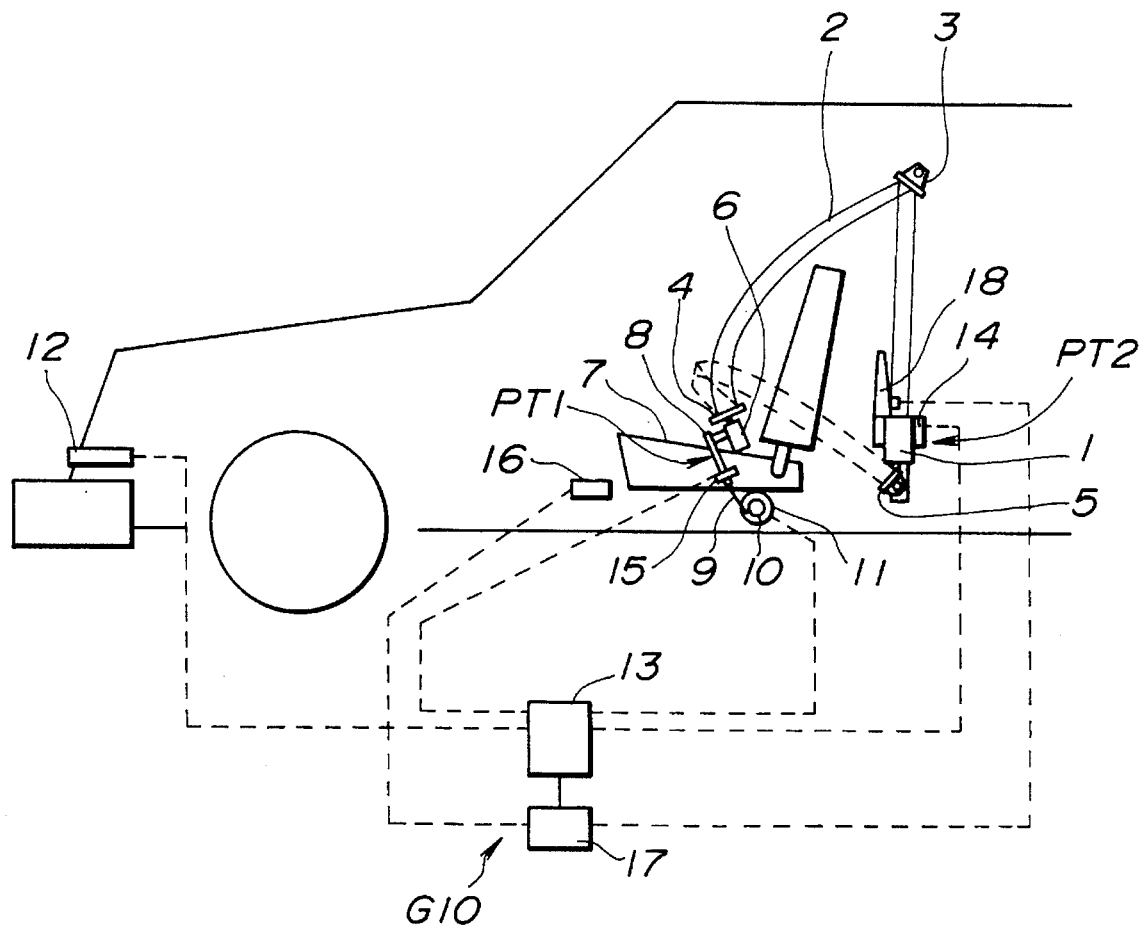
FIG. 1A is a schematic diagram showing a first embodiment of a passenger restraint belt system made in accordance with the invention.

With reference to the drawings, and in particular to FIG. 1A, there is shown a schematic diagram of a passenger restraint belt system embodying the invention. The restraint belt system includes a seat belt 2 whose lower end is received by an emergency lock retractor (ELR) 1 positioned on a vehicle floor or the lower portion of a vehicle center pillar. The other end of the seat belt 2 is looped through an aperture in a shoulder anchor attached to the upper portion of the vehicle center pillar and through an aperture in a tongue 4 and it is then attached to an anchor 5 attached, along with the retractor 1, to the vehicle floor or the lower portion of the vehicle center pillar. The tongue 4 is received in a buckle 6 to secure the restraint belt system in a first or normal occupant restraining position. In this first occupant restraining position, the seat belt 2 extends across the user's lap; while extending diagonally across the user's chest passing over the shoulder.

The restraint belt system also includes first and second pretension mechanisms PT1 and PT2 controlled by a control unit G10 which includes first and second control circuits 13 and 17 connected with each other. The first preloader mechanism PT1 operates in response to a first command signal fed thereto from the first control circuit 13 to pull the seat belt 2 from the first occupant restraining position to a second occupant restraining position. In the second occupant restraining position, the seat belt 2 restrains the seat passenger, under a first degree F1 of tension exerted on the seat belt 2, while allowing his or her operations for avoidance of vehicle collision. For this purpose, the first preloader mechanism PT1 is associated with the buckle 6 mounted for sliding movement along a rail 8 mounted on the frame of the seat 7. A wire 9, which is coupled to the buckle 6, extends from the rail 8 and it is wound around a pulley 10 driven by an electric motor 11. In the presence of the first command signal, the electric motor 11 is connected to a source of power and it rotates the pulley 10 to pull the wire 9 in a direction retracting the buckle 6 along the rail so as to exert the first degree F1 of tension on the seat belt 2. When the first control unit 13 produces a return signal, the direction of the electric motor 11 is reversed to return the buckle 6 to its initial position.

The second preloader mechanism PT2 operates in response to a second command signal fed thereto from the second control circuit 17 to retract the seat belt 2 further from the second occupant restraining position to a third occupant restraining position where a second, greater degree F2 of tension is exerted on the seat belt 2. The second degree F2 of tension is determined to restrain the seat passenger against the impacts which may be caused by a vehicle collision. For this purpose, the retractor 1 may be associated with a explosive preloader 18 which operates in response to the second command signal fed thereto from the second control circuit 17 to cause the retractor 1 to retract a small predetermined length of the seat belt 2.

Figure 1B:
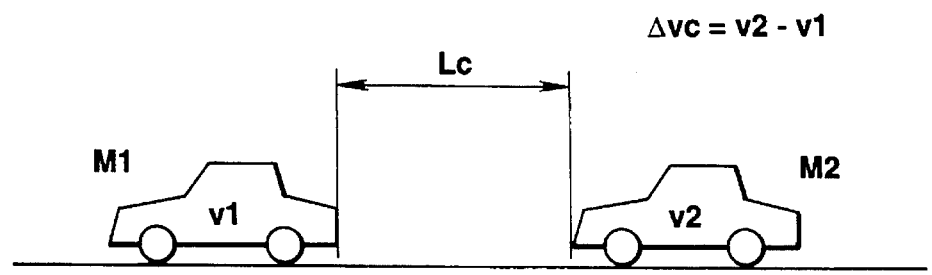
FIG. 1B is a schematic diagram showing used in explaining the operation of the passenger restraint belt system of the invention.

The first control circuit 13 produces the first command signal when a vehicle collision is anticipated and the return signal when no vehicle collision occurs after the first command signal is produced. The first control circuit 13 is connected to an ultrasonic sensor 12, a load cell 15, and a speed sensor associated with the electric motor 11. The ultrasonic sensor 12 is mounted on the front of the vehicle for receipt of an ultrasonic wave produced from the vehicle and reflected on the vehicle in front. The load cell 15 is sensitive to the tension F exerted on the seat belt 2 and it produces a sensor signal indicative of the sensed tension F. The speed sensor produces a signal indicative of the speed $vb1$ at which the electric motor 11 rotates. The first control circuit 13 utilizes the sensor signal fed thereto from the ultrasonic sensor 12 to measure the distance Lc (see FIG. 1B) between the vehicle M2 and the vehicle M1 in front and the speed $\Delta vc$ of the vehicle M2 with respect to the vehicle M1 in front. The relative speed $\Delta vc$ may be calculated based on changes in the distance Lc with time. The first control circuit 13 calculates the time $\Delta tc$ ($=Lc/\Delta vc$) it may take the vehicle M2 may come into collision with the vehicle M1 in front. The first control circuit 13 produces the first command signal in such a manner that the time tb1 required for the first preloader mechanism PT1 to retract the seat belt 2 so as to produce the first degree F1 of tension on the seat belt 2 is less than the calculated time $\Delta tc$. The first command signal is also applied to a belt clamping mechanism 14 which thereby locks the retractor 1 so as to prevent the seat belt 2 from being pulled out from the retractor 1. The first control circuit 13 calculates the time tb1 as $tb1=Lb1/vb1$ where $vb1$ is the speed at which the first preloader mechanism PT1 retracts the seat belt 2 and Lb1 is the full length or stroke the first preloader mechanism PT1 retracts the seat belt 2 to provide the first degree F1 of tension on the seat belt 2. The calculated time tb1 is stored in the first control circuit 13. The belt retracting stroke Lb1 is measured while operating the first preloader mechanism PT1 to produce the first degree F1 of tension on the seat belt 2 after the seat belt 2 is placed in the first occupant restraining position. The measured belt retracting stroke Lb1 is stored in the first control circuit 13. After the first control unit 13 stores the belt retracting stroke Lb1, it produces the return signal to return the seat belt 2 to its initial position. The belt retracting speed $vb1$ of the first preloader mechanism PT1 may be converted into the form of the speed of rotation of the electric motor 11. The converted motor speed is stored in the first control circuit 13.

The second control circuit 17 produces the second command signal to the second preloader mechanism PT2 when a vehicle collision is detected. For this detection, the second control circuit 17 is connected to a G sensor 16 mounted on the vehicle body. The second control circuit 17 detects the vehicle collision when the sensor signal fed thereto from the G sensor 16 indicates an abrupt vehicle deceleration. The second control circuit 17 measures the length or stroke Lb2 the second preloader mechanism PT2 retracts the seat belt 2 while operating the second preloader mechanism PT2 to retract the seat belt 2 further from the second occupant restraining position to the third occupant restraining position where the second degree F2 of tension is exerted on the seat belt 2. The measured belt retracting stroke Lb2 is stored in the second control circuit 17.

Figure 2:
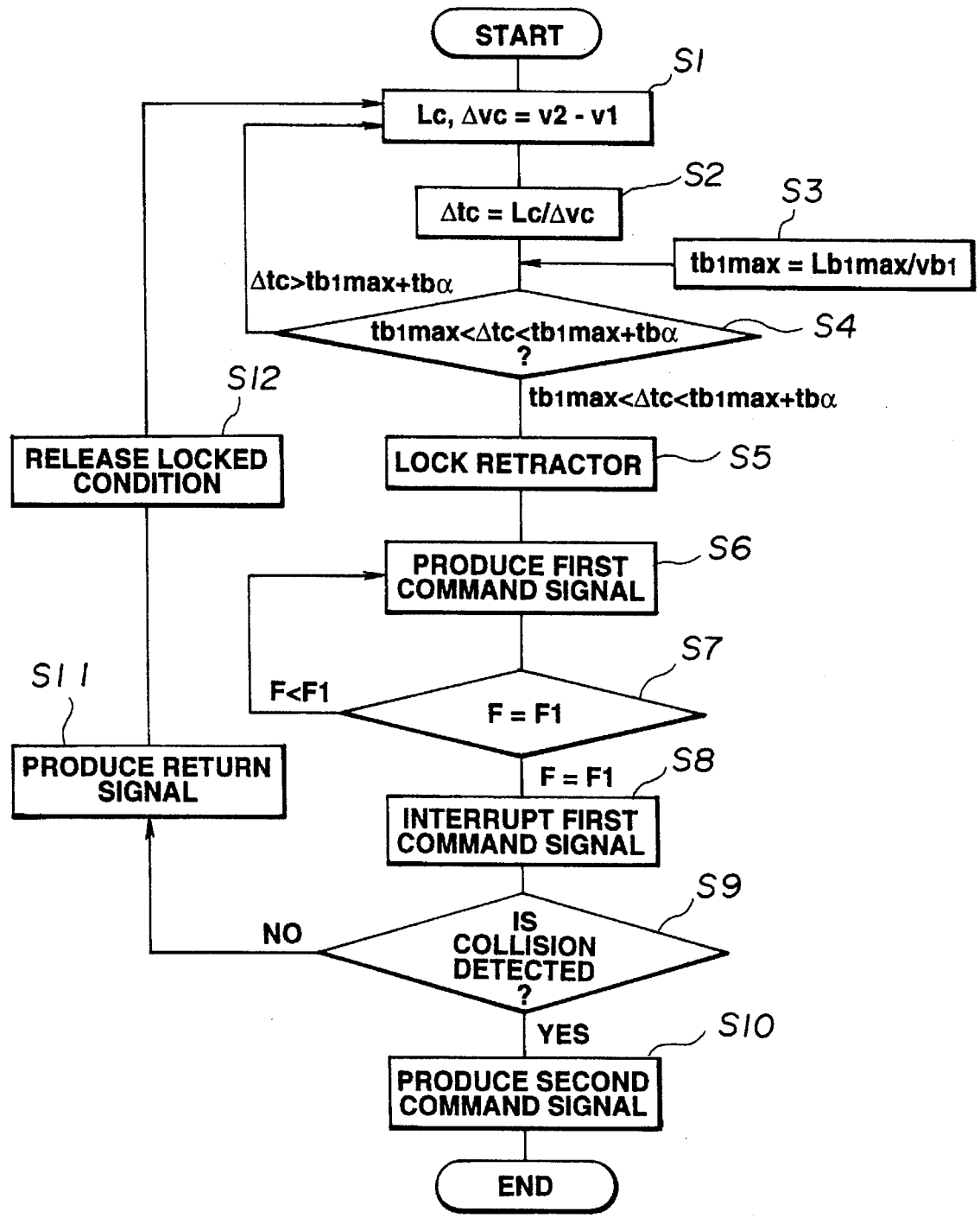
FIG. 2 is a flow diagram used in explaining the operation of the passenger restraint belt system of FIG. 1A.

Referring to FIG. 2, the operation of the passenger restraint belt system of the invention will be described further. At the step S1, the distance Lc (FIG.1B) between the vehicle M2 and the vehicle M1 in front and the speed $\Delta vc$ of the vehicle M1 with respect to the vehicle M1 in front are measured. These measurements are made based on the signal fed from the ultrasonic sensor 12. The relative speed $\Delta vc$ is given as $\Delta vc=v2-v1$ where v2 is the speed of travel of the vehicle M2 and v1 is the speed of travel of the vehicle M1 in front. The vehicle M2 may be a stopped vehicle or replaced with a fixed object. In this case, the speed v1 is zero. At the step S2, the time $\Delta tc$ it takes the vehicle M2 may come into collision with the vehicle M1 in front is calculated as $\Delta tc=Lc/\Delta vc$. At the step S3, the time tb1max required for the buckle 6 to be retracted over the full length or stroke is calculated based on the full stroke Lb1max of the buckle 6 and the speed vb1 at which the electric motor 11 rotates to retract the buckle 6. At the step S4, a determination is made as to whether the calculated time $\Delta tc$ is greater than the time tb1max required for the first preloader mechanism PT1 to retract the buckle 6 over the full stroke and less than the time (tb1max+tbα) where tbα is a predetermined short period of time. If $\Delta tc>tb1max+tb\alpha$, the relative speed $\Delta vc$ and the distance Lc are calculated again at the step S1. If $tb1max<\Delta tc<tb1max +tb\alpha$, then it means that there is a great degree of danger of the vehicle M2 coming in to collision with the vehicle M1 in front and, at the step S5, the first control circuit 13 produces a first command signal causing the belt clamping mechanism 14 to lock the retractor 1 so as to prevent the seat belt 2 from being pulled out further. The first command signal is also applied to connect the power source to the electric motor 11 which thereby rotates to retract the buckle 6 at the step S6.

At the step S7, a determination is made as to whether or not the tension F exerted on the seat belt 2 reaches the first degree F1. The tension F of the seat belt 2 is measured based on the sensor signal fed to the first control circuit 13 from the load cell 15. If the measured tension F reaches the first degree F1, then it means that the seat belt 1 has been placed in the second occupant restraining position and, at the step S8, the first control circuit 13 interrupts the first command signal so as to terminate retraction of the seat belt 2. Otherwise, the electric motor 11 is held connected to the power source to retract the buckle 6 a t the step S6.

At the step S9, a determination is made as to whether or not a vehicle collision is detected in spite of the driver's operation for avoiding the vehicle collision. This determination is made based on an abrupt vehicle deceleration indicative signal fed from the G sensor 16 to the second control circuit 17. If the answer to this question is "yes", then the second control circuit 17 produces the second command signal, at the step S10, to cause the second preloader mechanism PT2 (explosive preloader 18) to retract the seat belt 2 in a moment from the second occupant restraining position to the third occupant restraining position where the second degree F2 of tension is exerted on the seat belt 2. If no abrupt vehicle deceleration indicative signal occurs after a sufficient time longer than the time $\Delta tc$ has elapsed, it means that the vehicle collision was avoided and the first control circuit 13 produces the return signal, at the step S11, to reverse the direction of the electric motor 11. As a result, the buckle 6 is returned to its initial position where the seat belt 2 is placed in the first or normal occupant restraining position. At the step S12, the first control circuit 13 causes the belt clamping mechanism 14 to release its retractor locking condition.

When a collision of the vehicle M2 with the vehicle M1 in front is anticipated, the first control circuit 13 produces the first command signal to the belt clamping mechanism 14 which thereby locks the retractor 1 to prevent the seat belt 2 from being pulled out further from the retractor 1. The first command signal is also applied to connect the electric motor 11 to the power source. As a result, the buckle 6 is retracted to exert the first degree F1 of tension on the seat belt 2 which restrains the seat passenger while allowing his or her operations for avoidance of vehicle collision. When the collision of the vehicle M2 with the vehicle M1 in front is detected, the second control circuit 17 produces the second command signal causing the explosive preloader 18 to retract the seat belt 2 further from the second occupant restraining position to the third occupant restraining position where the second, greater degree F2 of tension is exerted on the seat belt 2. The second degree F2 of tension is suitable to restrain the seat passenger against the impacts which may be caused by the vehicle collision.

The second preloader mechanism PT2, that is, the explosive preloader 18, is used to retract the seat belt 2 around the retractor 1 from the second occupant restraining position. It is, therefore, possible to certainly exert the second degree F2 of tension in a short time on the seat belt 2. The second preloader mechanism PT2 is designed to retract a small predetermined length of the seat belt 2 from the second occupant restraining position. This is effective to simplify the second preloader mechanism PT2. When the vehicle M2 does not come into collision with the vehicle M1 in front after the first preloader mechanism PT1 operates, the direction of the electric motor 11 is reversed to return the buckle 6 to its initial position. As a result, the seat belt 2 is returned to the first or normal occupant restraining position.

Even if the first preloader mechanism PT1 operates mistakenly to exert the first degree F1 of tension on the seat belt 2 before a vehicle collision, the driver can operate to drive the vehicle. If only the second preloader mechanism PT2 operates mistakenly to retract the small predetermined length of the seat belt 2 from the first or normal occupant restraining position, the tension F exerted on the seat belt 2 will not reach the second degree F1 so that the driver can operate to drive the vehicle.

Figure 3:
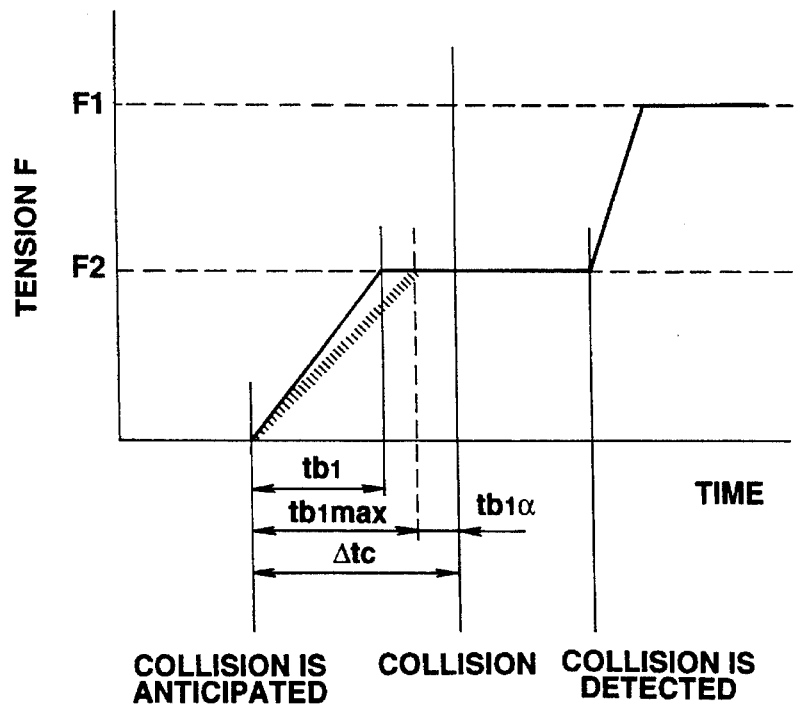
FIG. 3 is a graph showing variations in the tension F exerted on the seat belt with the lapse of time.
Figure 4:
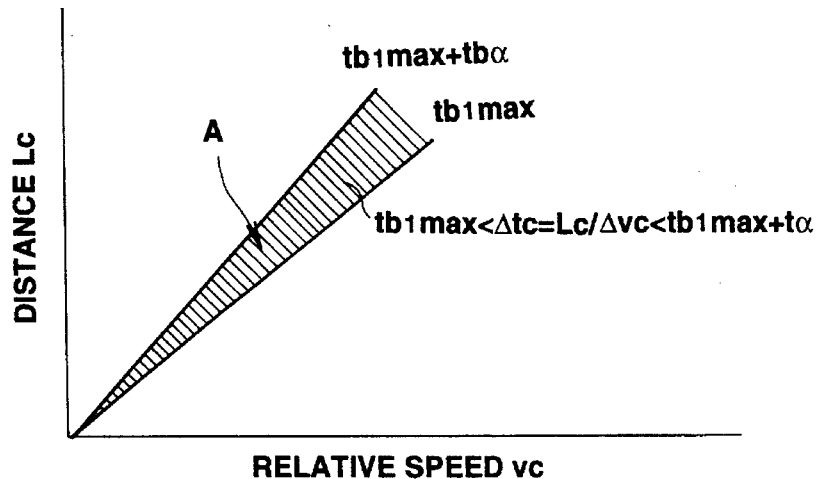
FIG. 4 is a graph showing a condition where a great danger of vehicle collision is anticipated.

FIG. 3 shows variations in the tension F exerted on seat belt 2 with the lapse of time. A great danger of vehicle collision is anticipated when the estimated time $\Delta tc$ it may take the vehicle comes into collision with the vehicle in front is longer than the time tb1max required for the buckle 6 to be retracted over the full stroke or length. In this case, the first control circuit 13 produces the first command signal causing the first preloader mechanism PT1 to start retracting the seat belt 2, as indicated by the solid line of FIG. 3. The great danger of vehicle collision is anticipated when the estimated time $\Delta tc$ (=Lc/vc) is within a region A defined between the time tb1max and a time (tb1max+tb$\alpha$) somewhat longer than the time tb1max, as shown in FIG. 4. It is, therefore, possible to ensure that the first preloader mechanism PT1 can complete retraction of the seat belt 2 before the vehicle collision.

As indicated by the solid line of FIG. 3, the actual time tb1 required to retract the buckle 6 over full stroke Lb1max is less than the time tb1max (indicated by the broken line of FIG. 3). It is, therefore, possible for the first preloader mechanism PT1 to absorb the belt slack which may be absorbed under the first degree F1 of tension before the vehicle collision. Since the first degree F1 of tension is set to restrain the seat passenger while allowing he or she to drive the vehicle, it is possible for the driver to avoid the vehicle collision. When the vehicle collision is avoided, the first preloader mechanism PT1 returns to its initial condition where it awaits receipt of the next first command signal from the first control circuit 13.

When the second control circuit 17 receives an abrupt vehicle deceleration indicative signal from the G sensor 16, it detects a vehicle collision and produces the second command signal causing the second preloader mechanism PT2 to retract the seat belt 2 to the third occupant restraining position where the second degree F2 of tension is exerted on the seat belt 2. Under the second degree F2 of tension, the driver is restrained to prevent operations to drive the vehicle. Of course, the driver's operations to drive the vehicle are not required after the vehicle comes in collision with the vehicle in front. The second preloader mechanism PT2 is not required to be used again. For this reason, the second preloader mechanism PT2 is taken in the form of an explosive preloader capable of producing a great degree of tension on the seat belt 2.

The almost whole amount of slack, which is provided on the seat belt 2 by the passenger's clothes and is a cause of variations in the length of the seat belt 2 retracted to provide an optimum occupant restraining condition, is absorbed when the first pretension mechanism PT1 operates to retract the belt seat 2 so as to provide the first degree F1 of tension on the seat belt 2. Therefore, the length Lb2 of the seat belt 2 to be retracted from the second occupant restraining position to the third occupant restraining position and the second degree F2 of the tension to be exerted on the seat belt 2 at the third occupant restraining position can be set substantially at a constant value.

Figure 5:
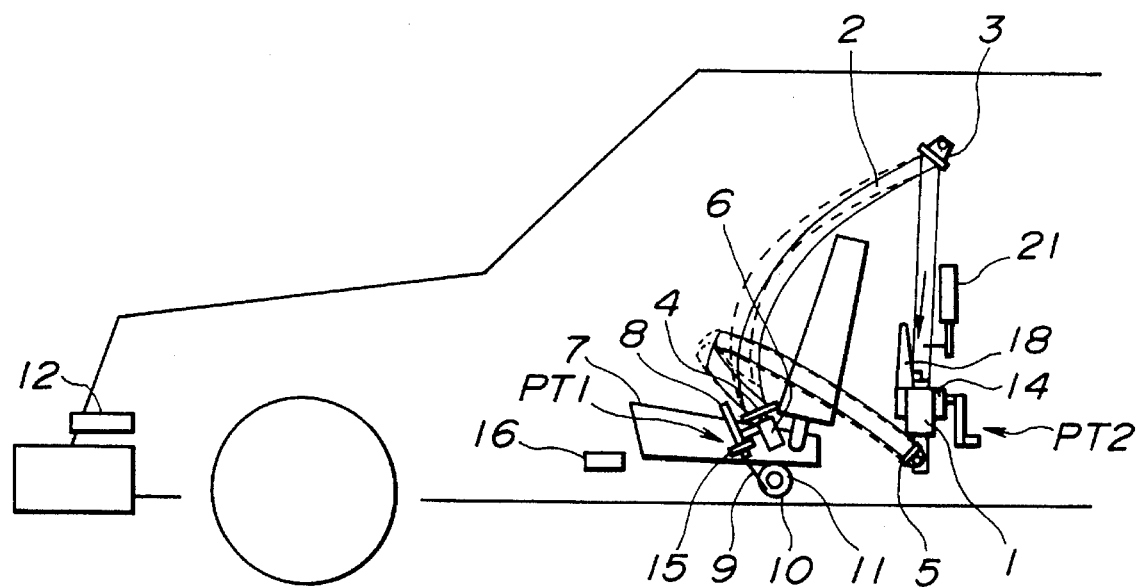
FIG. 5 is a schematic diagram used in explaining the manner in which the length the second preloader mechanism retracts the seat belt is determined.
Figure 6:
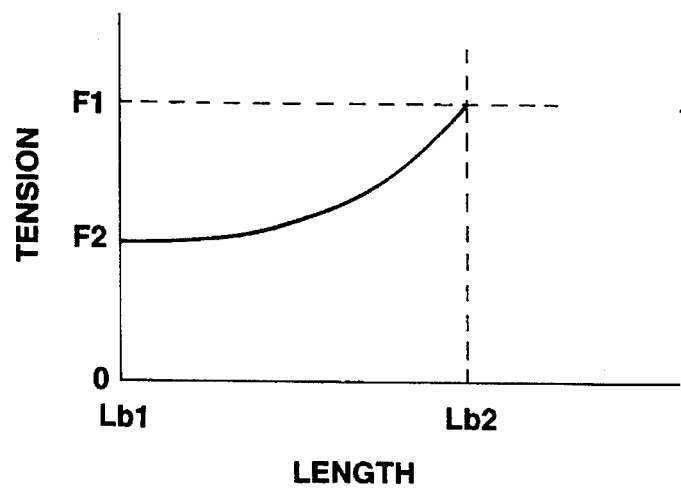
FIG. 6 is a graph showing the relationship between the length the second preloader mechanism retracts the seat belt and the tension exerted on the seat belt.

Referring to FIG. 5, description will be made to the manner in which the length Lb2 the second preloader mechanism PT2 retracts the seat belt 2 from the second occupant restraining position to the third occupant restraining position is determined. The shaft of the retractor 1 is rotated to retract the seat belt 2 further from the second occupant restraining position to the third occupant restraining position with the buckle 6 held retracted to the position where the first degree F1 of tension is exerted on the seat belt. A potentiometer 21 is used to measure the length the seat belt 2 is retraced further from the second occupant restraining position. The relationship between the measured length and the degree of tension exerted on the seat belt 2 is given as shown in FIG. 6. This relationship, which is obtained for each kind of vehicle in designing it, is used to determine the belt retracting characteristics of the second preloader mechanism PT2.

Figure 7:
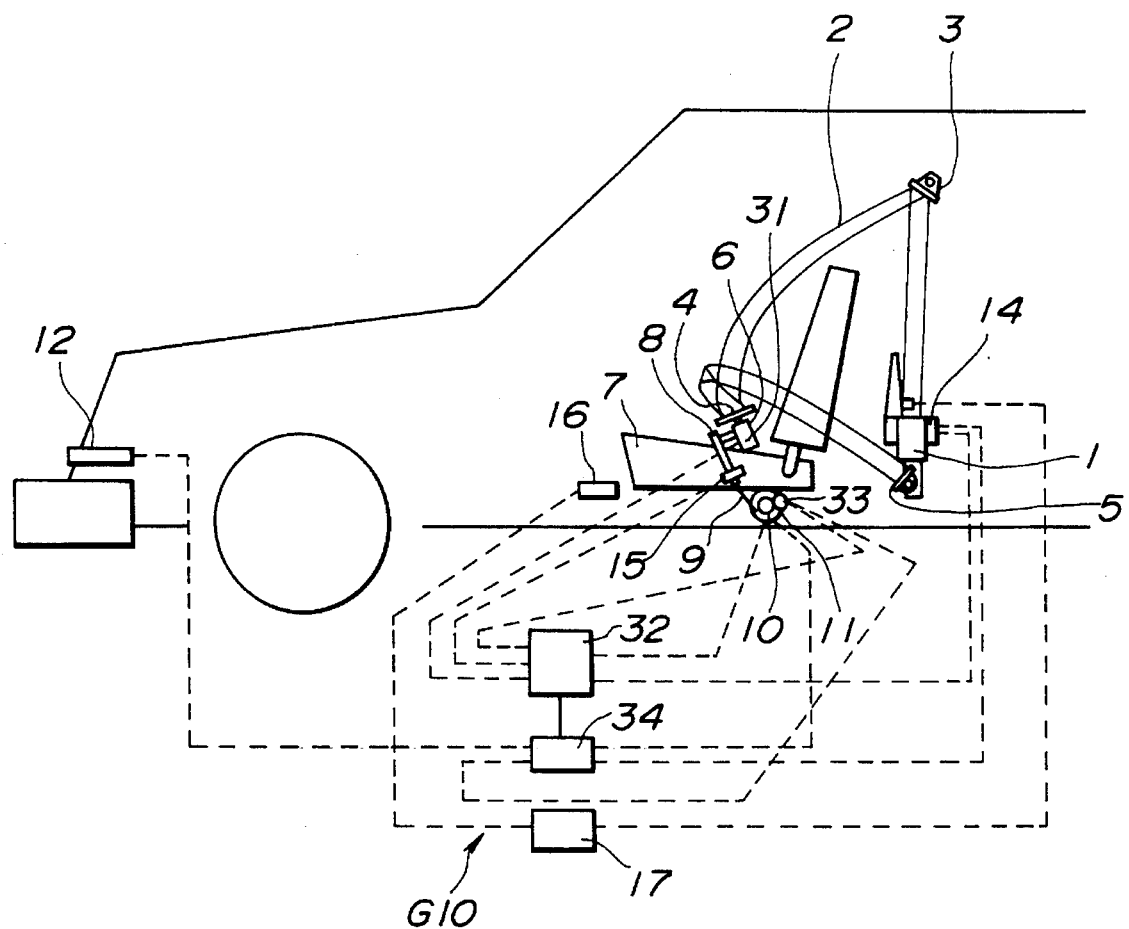
FIG. 7 is a schematic diagram showing a second embodiment of the passenger restraint belt system of the invention.

Referring to FIG. 7, there is shown a second embodiment of the passenger restraint belt system of the invention with the same elements being designated by the same reference numerals. In this embodiment, the first control circuit 13 is divided into first and second sections 32 and 34. The first section 32 is connected to the load cell 15, the speed sensor associated with the electric motor 11, and a buckle switch 31. The buckle switch 31 is turned on when the tongue 4 is inserted into the buckle 6 to place the seat belt 2 into the first occupant restraining position. The second section 34 is connected to the ultrasonic sensor 12, the speed sensor associated with the electric motor 1I, and a potentiometer 33 associated with the electric motor 11. The potentiometer 33 is used to measure the full length or stroke Lb1memo of the buckle 6.

When the buckle switch 31 is turned on, the first section 32 produces the first command signal causing the electric motor 11 to retract the buckle 6 so as to place the seat belt 2 in to the second occupant restraining position. Thereafter, the second section 34 uses the potentiometer 33 to measure the full length or stroke Lb1memo of the buckle 6. The measured full stroke Lb1memo is stored in the second section 34. The second section 34 calculates the time tb1memo required for the electric motor 11 to retract the buckle 6 over the full stroke based on the measured length Lb1memo and the speed vb1 at which the electric motor 11 rotates to retract the buckle 6. The second section 34 utilizes the sensor signal fed thereto from the ultrasonic sensor 12 to measure the distance Lc (see FIG. 1B) between the vehicle M2 and the vehicle M1 in front and the speed arc of the vehicle M2 with respect to the vehicle M1 in front. The relative speed Δvc may be calculated based on changes in the distance Lc with time. The second section 34 calculates the time Δtc (=Lc/Δvc) it may take the vehicle M2 may come in to collision with the vehicle M1 in front. The first section 32 produces the first command signal when the calculated time Δtc is within a range defined by the calculated time tb1memo and a time somewhat longer than the calculated time tb1memo. The first command signal is also applied to the belt clamping mechanism 14 which thereby locks the retractor 1 so as to prevent the seat belt 2 from being pulled out from the retractor 1. The first command signal is also applied to activate the electric motor 11 so as to retract the buckle 6. When the length Lb1 the electric motor 11 retracts buckle 6 reaches the stored length Lb1memo, the first section 32 interrupts the first command signal to stop the electric motor 11. As a result, the seat belt 2 is held at the second occupant restraining position. When a vehicle collision is detected, the first section 32 produces the second command signal to the second preloader mechanism PT2 which thereby cause the retractor 1 to retract the seat belt 2 from the second occupant restraining position to the third occupant restraining position where the second degree F2 of tension is exerted on the seat belt 2. When no vehicle collision is detected, the first section 32 produces the return signal to reverse the direction of the electric motor 11 so as to return the buckle 2 to its initial position. Thereafter, the belt clamping mechanism 14 is released. As a result, the seat belt 2 is returned to the first occupant restraining position.

Figure 8:
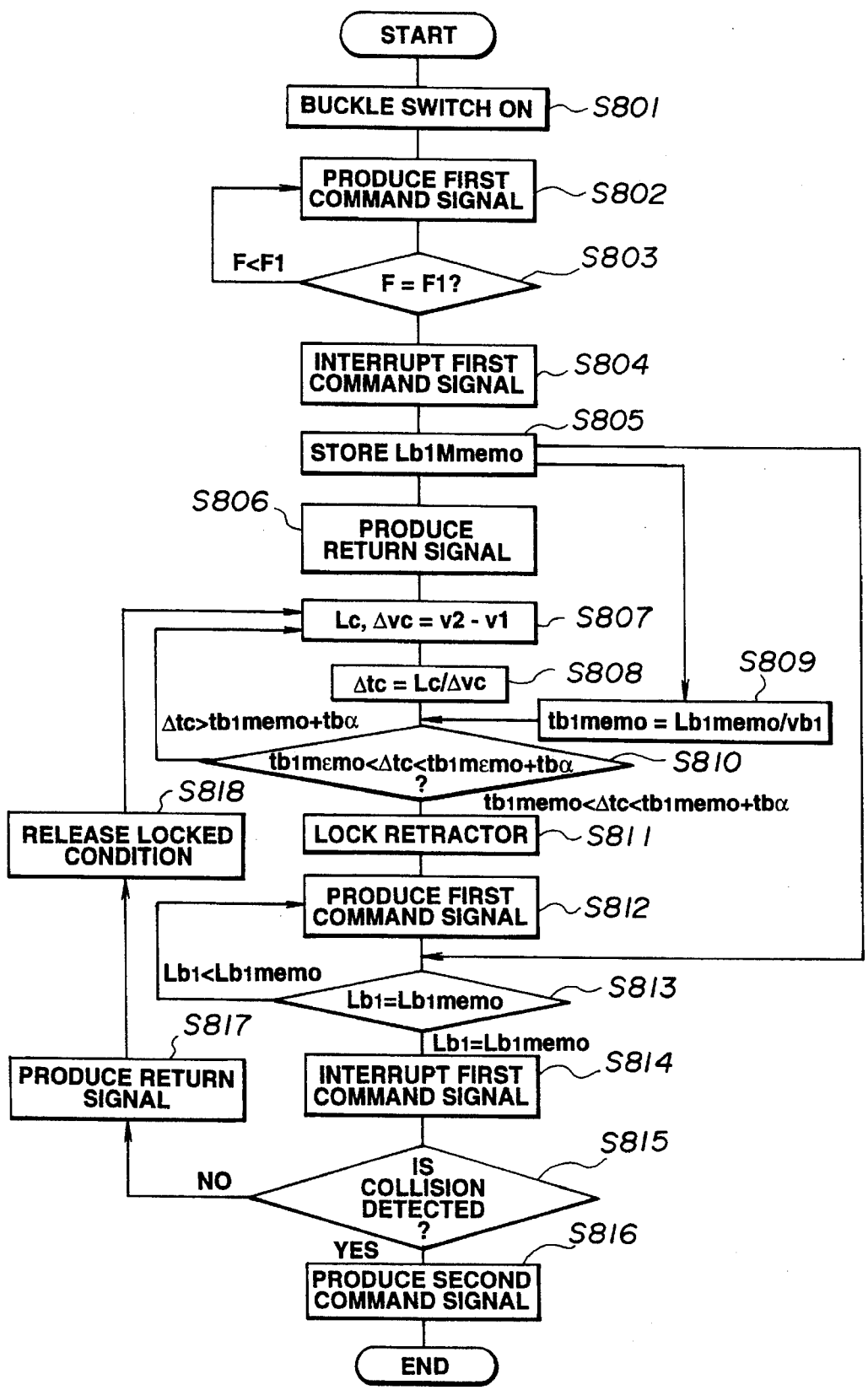
FIG. 8 is a flow diagram used in explaining the operation of the passenger restraint belt system of FIG. 7.

Referring to FIG. 8, the operation of the second embodiment will be described further when the seat belt 2 is placed in the first or normal occupant restraining position by inserting the tongue 4 into the buckle 6, the buckle switch 31 circuit 32 activate the electric motor 11 to retract the buckle 6 of the first preloader mechanism PT1 at the step S802. The buckle 6 is retracted until the load cell 15 detects that the tension F exerted on the seat belt 2 reaches a first degree F1. At the step S803, a determination is made as to whether or not the tension F exerted on the seat belt 2 reaches the first degree F1. If the answer to this question is "yes", then it means that the seat belt 2 is retracted to the second occupant restraining position and the electric motor 11 is stopped to terminate further retraction of the buckle 6 at the step S804. The length Lb1memo the buckle 6 is retracted is measured by the potentiometer 33 associated with the electric motor 11 and is stored in the control circuit 32 at the step S805. If the tension F is less than the first degree F1, then the buckle 6 remains retracted at the step S802. At the step S806, the direction of the electric motor 11 is reversed to return the buckle 6 to its initial position.

When the vehicle is placed into normal running conditions, at the step S807, the distance Lc between the vehicle M2 and the vehicle M1 in front and the speed Δvc of the vehicle M1 with respect to the vehicle M1 in front are measured. These measurements are made based on the signal fed from the ultrasonic sensor 12. The relative speed Δvc is given as Δvc=v2−v1 where v2 is the speed of travel of the vehicle M2 and v1 is the speed of travel of the vehicle M1 in front. The vehicle M2 may be a stopped vehicle or replaced with a fixed object. In this case, the speed v1 is zero. At the step S808, the time Δtc it takes the vehicle M2 comes into collision with the vehicle M1 in front is calculated as Δtc=Lc/Δvc. At the step S809, the control circuit 34 calculates the time tb1memo required for the buckle 6 to be retracted to the maximum extent (full stroke) based on the stored length Lb1memo and the speed vb1 at which the electric motor 11 rotates to retract the buckle 6. At the step S810, a determination is made as to the calculated time Δtc is greater than the time tb1memo and less than the time (tb1memo+tbα). If Δtc>tb1memo+tbα, then it means no danger of the vehicle M2 coming in to collision with the vehicle M1 in front and the relative speed Δvc and the distance Lc are calculated again at the step S807. If tb1memo<Δtc<tb1memo+tbα, then it means that there is a great degree of danger of the vehicle M2 coming into collision with the vehicle M1 in front and, at the step S811, the belt clamping mechanism 14 operates to lock the retractor 1 so as to prevent the seat belt 2 from being pulled out further. The electric motor 11 is activated to retract the buckle 6 at the step S812.

At the step S813, a determination is made as to whether or not the length Lb1 the buckle 6 is retracted reaches the stored length Lb1memo. The length Lb1 the buckle 6 is retracted is measured by the potentiometer 33. If the measured length Lb1 reaches the stored value Lb1memo, then it means that the seat belt 1 has been placed in the second occupant restraining position and, at the step S814, the electric motor 11 is disconnected from the power source so that the first preloader mechanism PT1 terminates retraction of the seat belt 2. Otherwise, the electric motor 11 remains activated to retract the buckle 6 at the step S812.

At the step S815, a determination is made as to whether or not a vehicle collision is detected in spite of the driver's operation for avoiding the vehicle collision. This determination is made based on an abrupt vehicle deceleration indicative signal fed from the G sensor 16 to the second control unit 17. If the answer to this question is "yes", then the second control unit 17 produces a second command signal, at the step S816, to cause the explosive preloader 18 to retract the seat belt 2 in a moment from the second occupant restraining position to the third occupant restraining position so as to exert a second degree F2 of tension on the seat belt 2. If no abrupt vehicle deceleration indicative signal occurs after a sufficient time longer than the time Δtc has elapsed, it means that the vehicle collision was avoided and the direction of the electric motor 11 is reversed to return the buckle 6 to its initial position at the point 817. At the step S818, the retractor locking condition of the belt clamping mechanism 14 is released.

Figure 9:
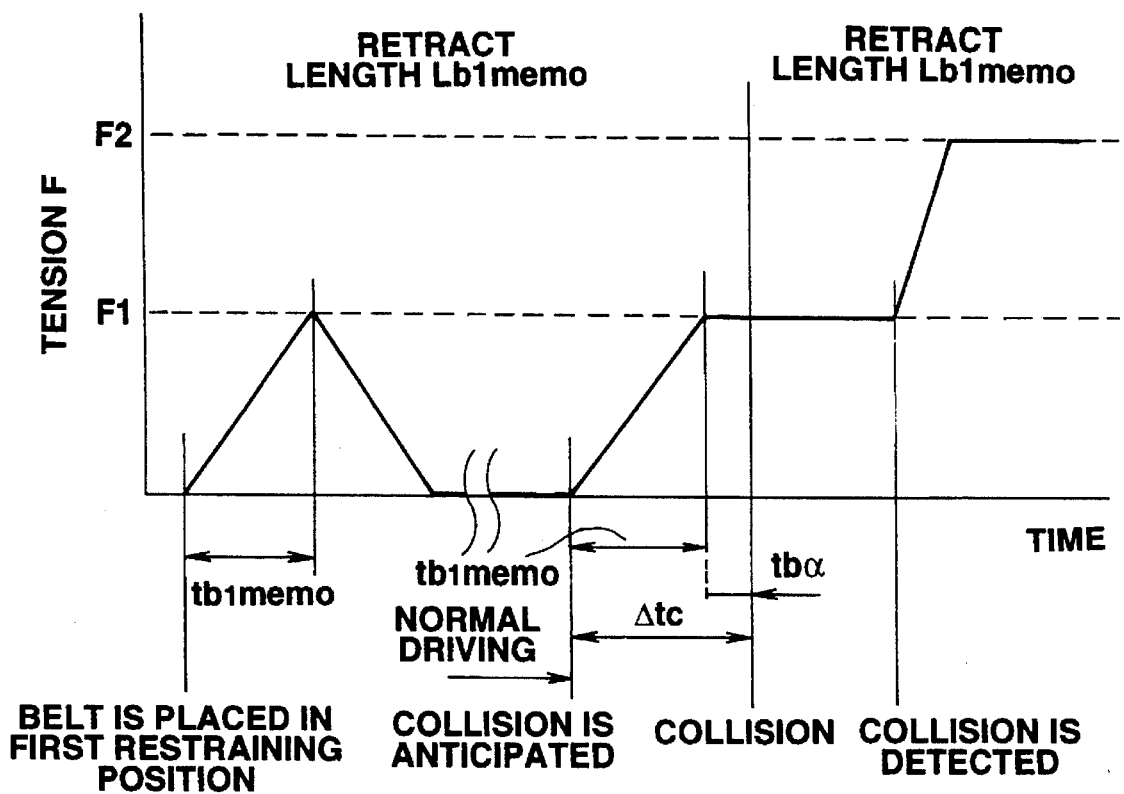
FIG. 9 is a graph showing variations in the tension F exerted on the seat belt with the lapse of time.

FIG. 9 shows variations in the tension F exerted on seat belt 2 with the lapse of time. Just after the seat belt 2 is placed in the first or normal occupant restraining position, the electric motor 11 starts operating to retract the buckle 6 so as to produce the first degree F1 of tension on the seat belt 2. The time tb1memo during which the electric motor 11 operates to provide the first degree F1 of tension on the seat belt 2 is measured and stored. The stored time tb1memo is used to retract the buckle 6 so as to provide the first degree F1 of tension on the seat belt 2 when a vehicle collision is anticipated.

The length Lb1memo the buckle 6 is retracted is measured by the potentiometer 33 associated with the electric motor 11 and is stored in the control circuit 32. Since the length Lb1memo is normally less than the full stroke Lb1max of the buckle 6, the time tb1memo required in the second embodiment to increase the tension on the seat belt 2 to the first degree F1 is less than the time tb1max required in the first embodiment to increase the tension on the seat belt 2 to the first degree F1. This is effective to reduce the frequency at which the first preloader mechanism PT1 operates.

Figure 10:
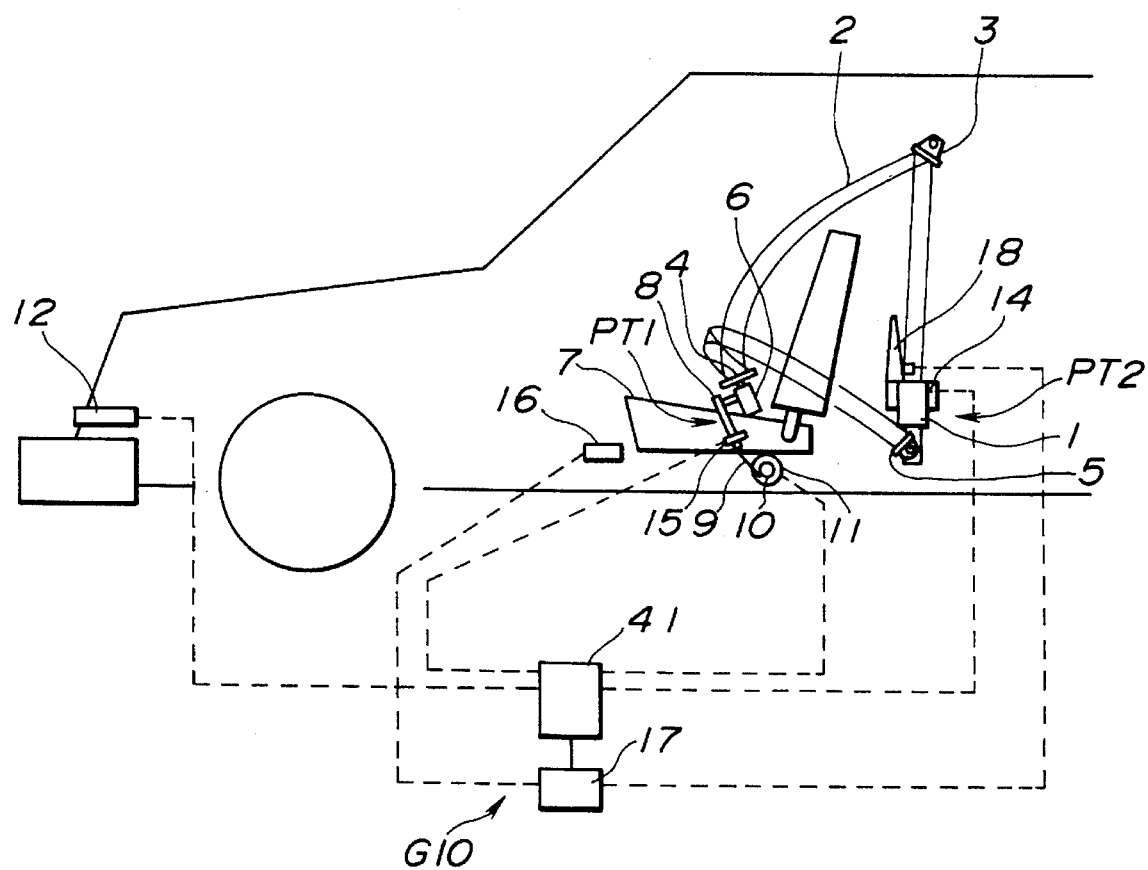
FIG. 10 is a schematic diagram showing a third embodiment of the passenger restraint belt system of the invention.

Referring to FIG. 10, there is shown a third embodiment of the passenger restraint belt system of the invention with the same elements being designated by the same reference numerals. In this embodiment, the first control circuit 41 produces a first command signal at intervals of time to operate the first preloader mechanism PT1 so as to increase the tension F exerted on the seat belt 2 to the first degree F1 in a plurality of (in this case four) stages during a period of time $\Delta tc$ it takes the vehicle M2 may come into collision with the vehicle M1 in front.

Figure 11:
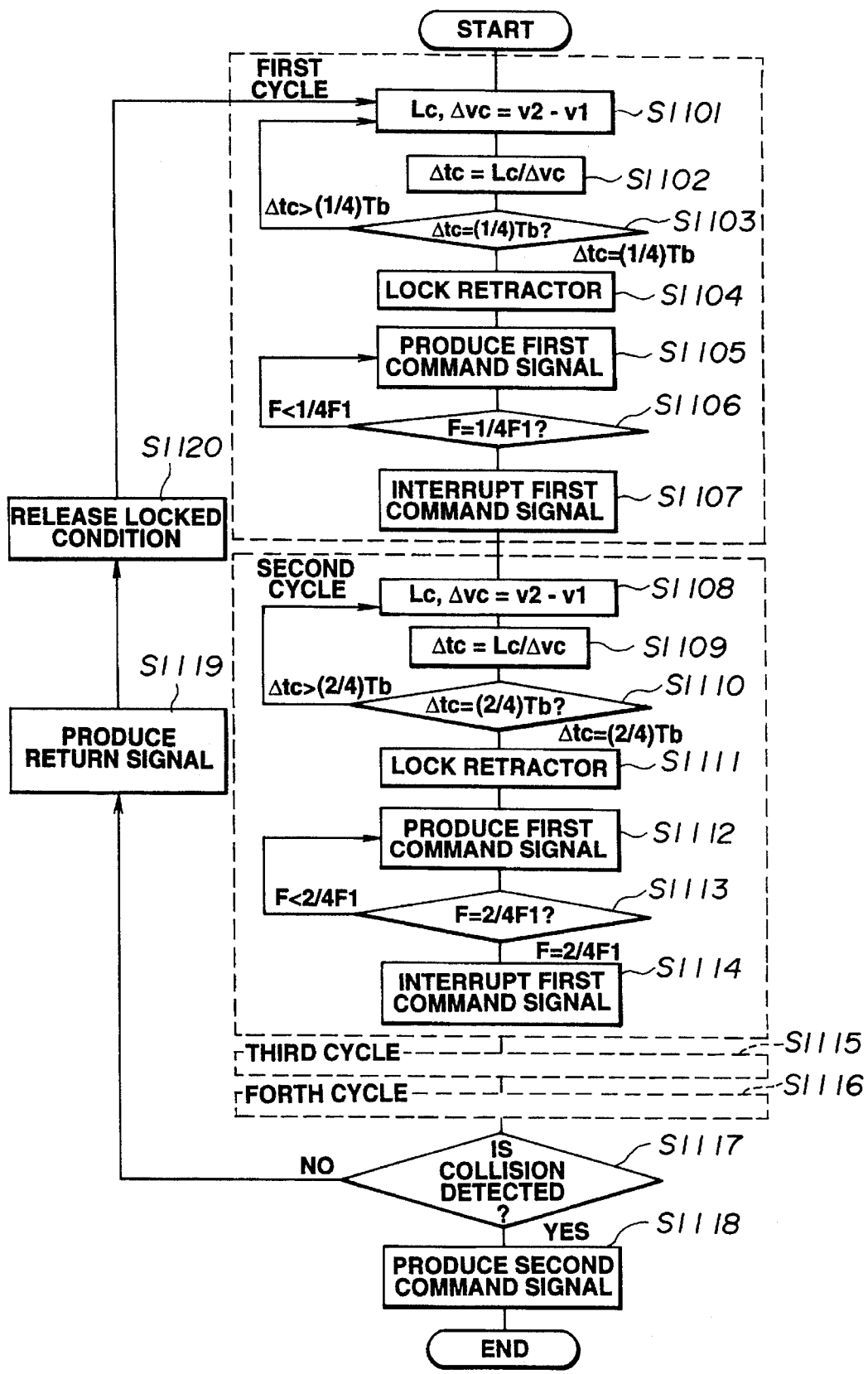
FIG. 11 is a flow diagram used in explaining the operation of the passenger restraint belt system of FIG. 10.

Referring to FIG. 11, the operation of the third embodiment will be described further. A t the step S1101, the distance Lc between the vehicle M2 and the vehicle M1 in front and the speed $\Delta vc$ of the vehicle M1 with respect to the vehicle M1 in front are measured. These measurements are made based on the signal fed from the ultrasonic sensor 12. The relative speed $\Delta vc$ is given as $\Delta vc=v2-v1$ where v2 is the speed of travel of the vehicle M2 and v1 is the speed of travel of the vehicle M1 in front. The vehicle M2 may be a stopped vehicle or replaced with a fixed object. In this case, the speed v1 is zero. At the step S1102, the time $\Delta tc$ it takes the vehicle M2 to come into collision with the vehicle M1 in front is calculated as $\Delta tc=Lc/\Delta vc$. At the step S1103, a determination is made as to the calculated time arc reaches the time $(1/4)\cdot Tb$ required for the first preloader mechanism PT1 to retract the full stroke Lb1 of the buckle 6. If $\Delta tc>(1/4)\cdot Tb$, then the relative speed $\Delta vc$ and the distance Lc are calculated again at the step SllO1. If $\Delta tc=(1/4)\cdot Tb$, then, at the step S1104, the first control circuit 41 produces a first command signal causing the belt clamping mechanism 14 to lock the retractor 1 so as to prevent the seat belt 2 from being pulled out further. The first command signal is also applied to connect the power source to the electric motor 11 which thereby rotates to retract the buckle 6 at the step S1105.

At the step S1106, a determination is made as to whether or not the tension F exerted on the seat belt 2 reaches one-fourth of the firs t degree F1. The tension F of the seat belt 2 is measured based on the sensor signal fed to the first control circuit 41 from the load cell 15. If the measured tension F is less than one-fourth of the first degree F1, then the electric motor 11 is held connected to the power source to retract the buckle 6 further at the step S1105. If the measured tension F reaches one-fourth of the first degree F1, then, at the step S1107, the first control circuit 41 interrupts the first command signal to disconnect the electric motor 11 from the power source. This terminates retraction of the seat belt 2 and holds the seat belt 2 in a first stop position where one-fourth of the first degree F1 of tension is exerted on the seat belt 2.

Upon completion of this first stage of the buckle retracting operation, similar steps are repeated for the second stage of the buckle retracting operation. That is, at the step S1108, the distance Lc between the vehicle M2 and the vehicle M1 in front and the speed $\Delta vc$ of the vehicle M1 with respect to the vehicle M1 in front are measured. These measurements are made based on the signal fed from the ultrasonic sensor 12. The relative speed $\Delta vc$ is given as $\Delta vc=v2-v1$ where v2 is the speed of travel of the vehicle M2 and v1 is the speed of travel of the vehicle M1 in front. At the step S1109, the time $\Delta tc$ it takes the vehicle M2 may come into collision with the vehicle M1 in front is calculated as $\Delta tc=Lc/\Delta vc$. At the step S1110, a determination is made as to the calculated time $\Delta tc$ reaches the time $(2/4)\cdot Tb$ required for the first preloader mechanism PT1 to retract the remaining stroke of the buckle 6 from the first stop position. If $\Delta tc>(2/4)\cdot Tb$, then the relative speed $\Delta vc$ and the distance Lc are calculated again at the step S1108. If $\Delta tc=(2/4)\cdot Tb$, then, at the step S1111, the first control circuit 41 produces a first command signal causing the belt clamping mechanism 14 to lock the retractor 1 so as to prevent the seat belt 2 from being pulled out further. The first command signal is also applied to connect the power source to the electric motor 11 which thereby rotates to retract the buckle 6 further from the first stop position at the step S1112.

At the step S1113, a determination is made as to whether or not the tension F exerted on the seat belt 2 reaches two-fourths of the first degree F1. The tension F of the seat belt 2 is measured based on the sensor signal fed to the first control circuit 41 from the load cell 15. If the measured tension F is less than two-fourths of the first degree F1, then the electric motor 11 is held connected to the power source to retract the buckle 6 further at the step S1112. If the measured tension F reaches two-fourths of the first degree F1, then, at the step S1114, the first control circuit 41 interrupts the first command signal to disconnect the electric motor 11 from the power source so as to terminate retraction of the seat belt 2. As a result, the seat belt is held at a second stop position where two-fourths of the first degree F1 of tension is exerted on the seat belt 2.

Upon completion of this second stage of the buckle retracting operation, similar steps are repeated for the third and fourth stages S1115 and S1116 of the buckle retracting operation. When the fourth stage of the buckle retracting operation is completed, the tension F exerted on the seat belt 2 will reach the first degree F1.

At the step S1117, a determination is made as to whether or not a vehicle collision is detected in spite of the driver's operation for avoiding the vehicle collision. This determination is made based on an abrupt vehicle deceleration indicative signal fed from the G sensor 16 to the second control circuit 17. If the answer to this question is "yes", then the second control circuit 17 produces a second command signal, at the step S1118, to cause the explosive preloader 18 to retract the seat belt 2 in a moment from the second occupant restraining position to the third occupant restraining position so as to exert a second degree F2 of tension on the seat belt 2. If no abrupt vehicle deceleration indicative signal occurs after a sufficient time longer than the time $\Delta tc$ has elapsed, it means that the vehicle collision was avoided and the first control circuit 41 produces a return signal, at the step S1119, to reverse the direction of the electric motor 11 so as to return the buckle 6 to its initial position. At the step S1120, the first control circuit 41 produces a command to release the retractor locking condition of the belt clamping mechanism 14.

Figure 12:
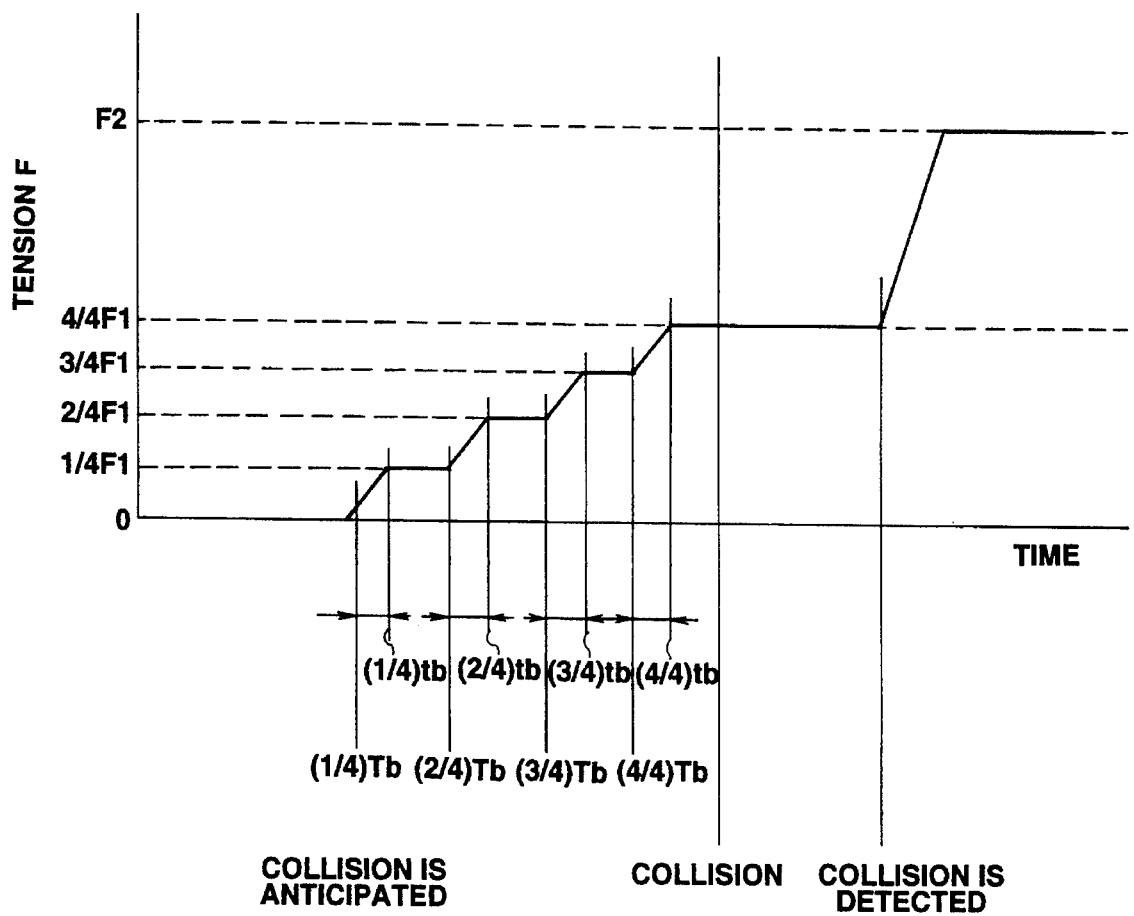
FIG. 12 is a graph showing variations in the tension F exerted on the seat belt with the lapse of time.

FIG. 12 shows variations in the tension F exerted on seat belt 2 with the lapse of time. At the first stage of operation, the time $\Delta tc$ it takes the vehicle M2 may come into collision with the vehicle M1 in front is calculated. When the calculated time $\Delta tc$ reaches the time $(1/4)\cdot Tb$ required for the first preloader mechanism PT1 to retract the full stroke of the buckle 6, the first preloader mechanism PT1 operates to retract the buckle 6 from its initial position to the first stop position so as to exert one-fourth of the first degree F1 of tension on the seat belt at a time $(1/4)\cdot tb$. The buckle 6 is held at the first stop position upon completion of the first stage of operation. At the second stage of operation, the time $\Delta tc$ it takes the vehicle M2 may come into collision with the vehicle M1 in front is calculated. When the calculated time $\Delta tc$ reaches the time $(2/4)\cdot Tb$ required for the first preloader mechanism PT1 to retract the remaining stroke of the buckle 6 from the first stop position, the first preloader mechanism PT1 operates to retract the buckle 6 from the first stop position to the second stop position so as to exert two-fourths of the first degree F1 of tension on the seat belt 2 at a time $(2/4)\cdot tb$. The buckle 6 is held at the second stop position upon completion of the second stage of operation. Upon completion of the second stage of operation, similar steps are repeated. When the fourth stage of operation is completed, the tension F exerted on the seat belt 2 reaches the first degree F1.

In this embodiment, the length of the seat belt 2 and, thus, the tension exerted on the seat belt 2 increases as the time $\Delta tc$ it takes the vehicle M2 may come into collision with the vehicle M1 in front decreases. Even if the buckle 6 is not retracted over its full stroke because of an abrupt increase of the relative speed $\Delta vc$ when a vehicle collision occurs, a great degree of tension will be exerted on the seat belt 2 to provide a good occupant restraining condition. Since retraction of the buckle 6 is started at a time determined by new information of relative speed $\Delta vc$ and distance Lc, it is possible to provide a fast response to a change of the relative speed $\Delta vc$ after the last stage of operation.

Figure 13:
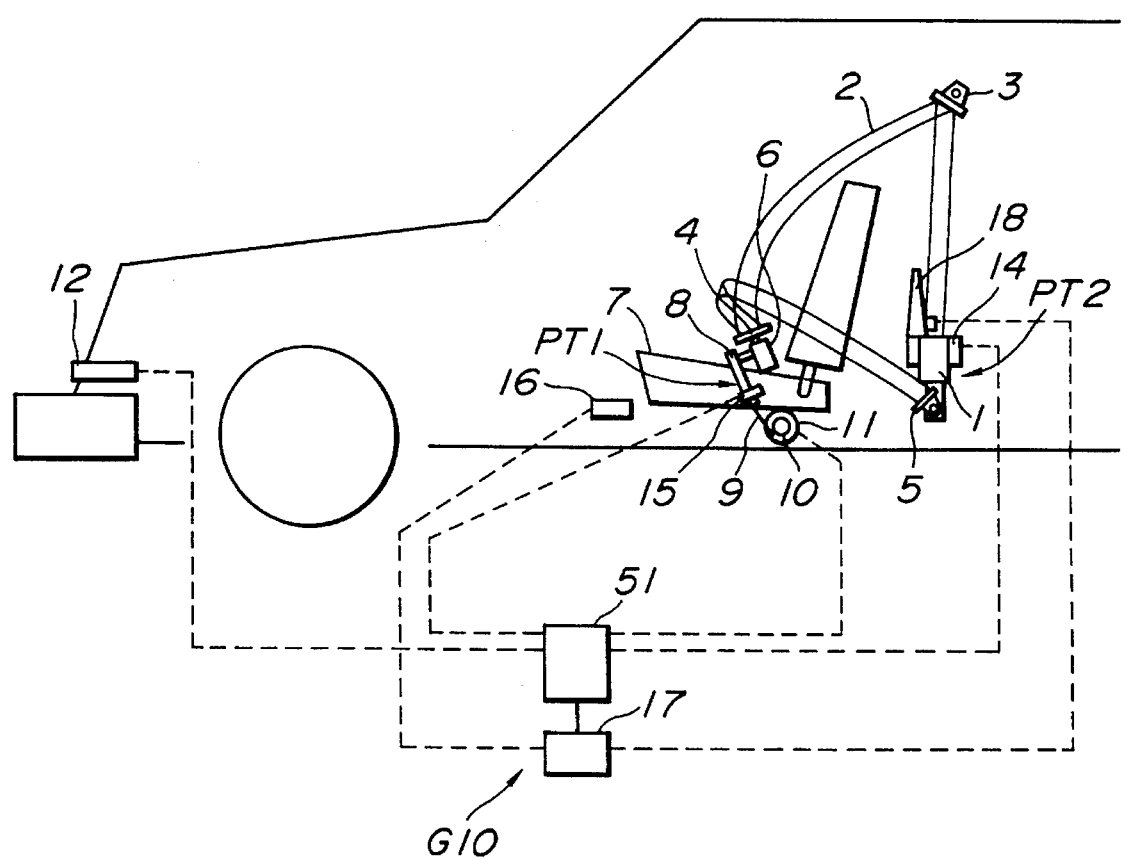
FIG. 13 is a schematic diagram showing a fourth embodiment of the passenger restraint belt system of the invention.

Referring to FIG. 13, there is shown a fourth embodiment of the passenger restraint belt system of the invention with the same elements being designated by the same reference numerals. In this embodiment, the first control circuit 51 calculates the time $\Delta tc$ it takes the vehicle M2 may come into collision with the vehicle M1 in front at intervals of time. The first control circuit 51 produces a first command signal at intervals of time to operate the first preloader mechanism PT1 so that the tension F exerted on the seat belt 2 is given as $F=(1-\Delta tc/Tb) \times F1$ where Tb is the time required for the first preloader mechanism PT1 to retract the buckle 6 over its full stroke.

Figure 14:
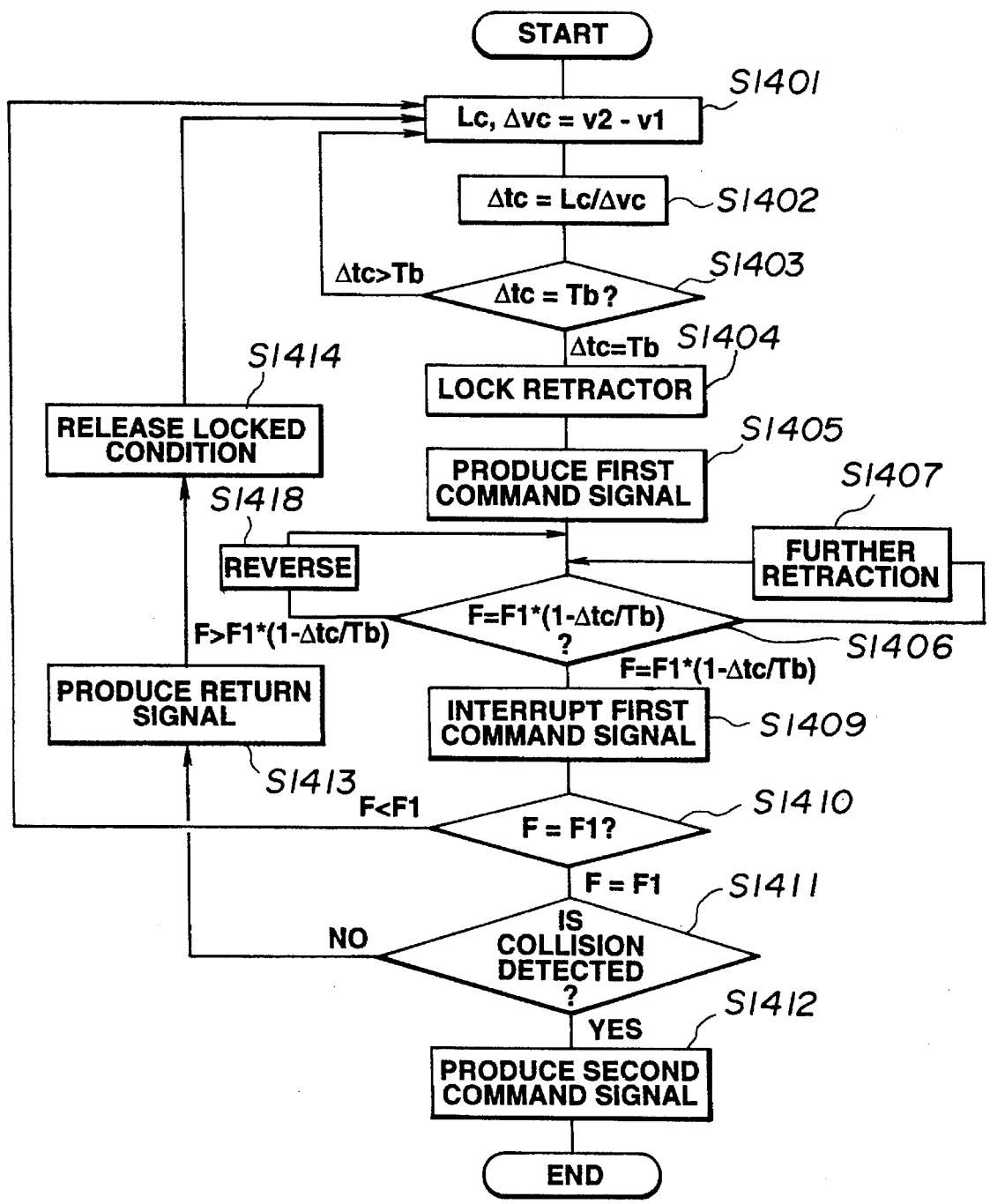
FIG. 14 is a flow diagram used in explaining the operation of the passenger restraint belt system of FIG. 13.

Referring to FIG. 14, the operation of the fourth embodiment will be described further. At the step S1401, the distance Lc between the vehicle M2 and the vehicle M1 in front and the speed $\Delta vc$ of the vehicle M1 with respect to the vehicle M1 in front are measured. These measurements are made based on the signal fed from the ultrasonic sensor 12. The relative speed $\Delta vc$ is given as $\Delta vc=v2-v1$ where v2 is the speed of travel of the vehicle M2 and v1 is the speed of travel of the vehicle M1 in front. The vehicle M2 may be a stopped vehicle or replaced with a fixed object. In this case, the speed v1 is zero. At the step S1402, the time $\Delta tc$ it takes the vehicle M2 may come into collision with the vehicle M1 in front is calculated as $\Delta tc=Lc/\Delta vc$. At the step S1403, a determination is made as to the calculated time atc reaches the time Tb required for the first preloader mechanism PT1 to retract the full stroke Lb1 of the buckle 6. If $\Delta tc>Tb$, then the relative speed $\Delta vc$ and the distance Lc are calculated again at the step S1401. If $\Delta tc=Tb$, then, at the step S1404, the first control circuit 51 produces a first command signal opera ting the belt clamping mechanism 14 to lock the retractor 1 so as to prevent the seat belt 2 from being pulled out further. The first command signal is also applied to connect the power source to the electric motor 11 which thereby rotates to retract the buckle 6 at the step S1405.

At the step S1406, a determination is made as to whether or not the tension F exerted on the seat belt 2 reaches $F1 \times (1-\Delta tc/Tb)$. The tension F of the seat belt 2 is measured based on the sensor signal fed to the first control circuit 51 from the load cell 15. If $F<F1 \times (1-\Delta tc/Tb)$, then the electric motor 11 is held connected to the power source to retract the buckle 6 further at the step S1407. If $F>F1 \times (1-\Delta tc/Tb)$, then the direction of the electric motor 11 is reversed to decrease the length the buckle 6 is retracted. If $F=F1 \times (1-\Delta tc/Tb)$, then, at the step S1409, the first control circuit 51 interrupts the first command signal to disconnect the electric motor 11 from the power source. This terminates retraction of the seat belt 2 and holds the seat belt 2 in the existing position.

At the step S1410, a determination is made as to whether or not the tension F exerted on the seat belt 2 is equal to the first degree F1. If F<F1, then, at the step si401, the distance Lc between the vehicle M2 and the vehicle M1 in front and the speed $\Delta vc$ of the vehicle M1 with respect to the vehicle M1 in front are measured. If F=F1, then another determination is made at the step S1411. This determination is as to whether or not a vehicle collision is detected in spite of the driver's operation for avoiding the vehicle collision. This determination is made based on an abrupt vehicle deceleration indicative signal fed from the G sensor 16 to the second control unit 17. If the answer to this question is "yes", then the second control unit 17 produces a second command signal, at the step S1412, to cause the explosive preloader 18 to retract the seat belt 2 in a moment from the second occupant restraining position to the third occupant restraining position so as to exert a second degree F2 of tension on the seat belt 2. If no abrupt vehicle deceleration indicative signal occurs after a sufficient time longer than the time $\Delta tc$ has elapsed, it means that the vehicle collision was avoided and the first control circuit 51 produces a return signal, at the step S1413, to reverse the direction of the electric motor 11 so as to return the buckle 6 to its initial position. At the step S1414, the first control circuit 51 produces a command to release the retractor locking condition of the belt clamping mechanism 14.

Figure 15:
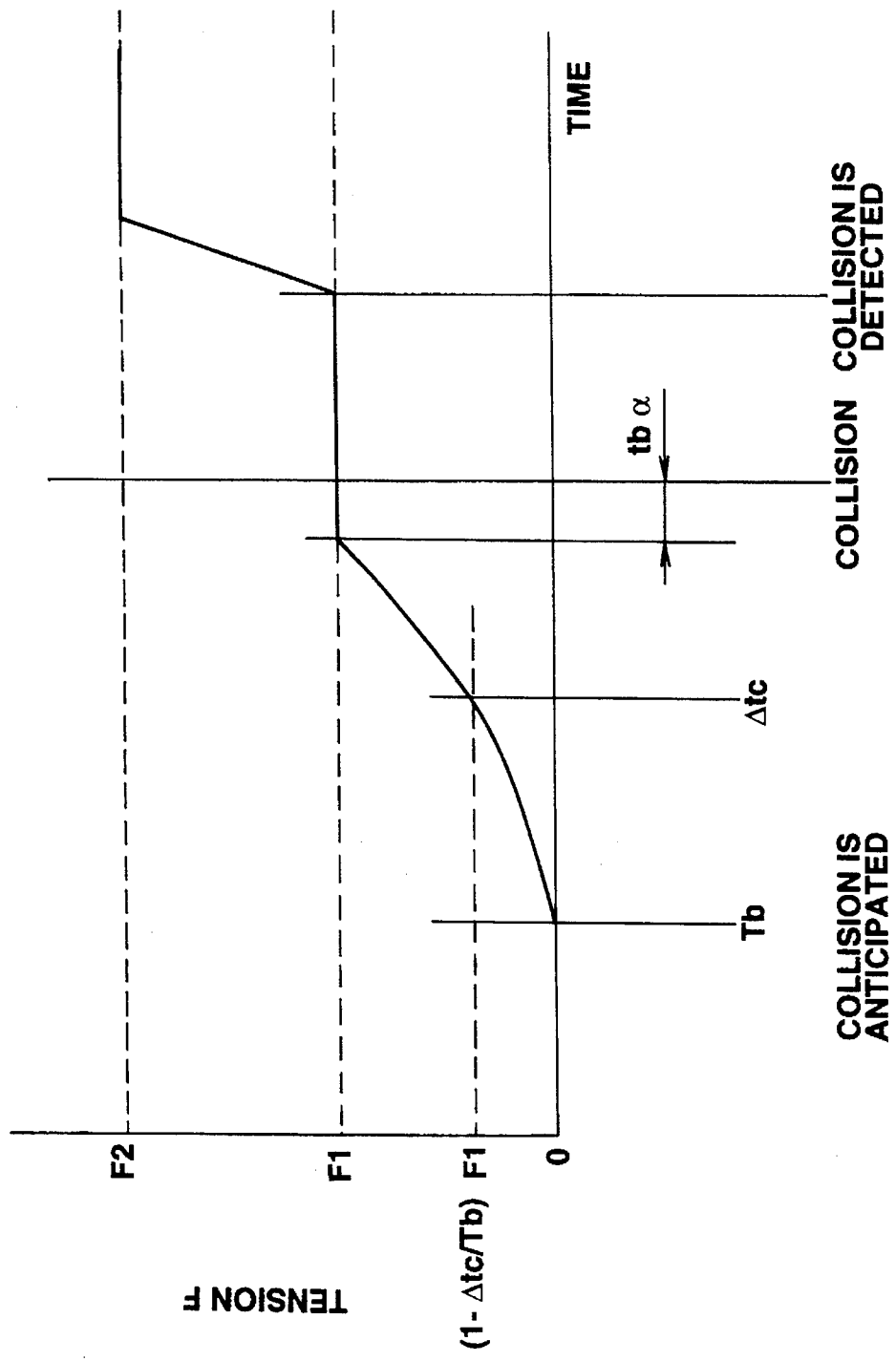
FIG. 15 is a graph showing variations in the tension F exerted on the seat belt with the lapse of time.

FIG. 15 shows variations in the tension F exerted on seat belt 2 with the lapse of time. At the time Tb, the first preloader mechanism PT1 starts operating to retract the buckle 6 so as to continuously increase the tension F exerted on the seat belt 2 along a curve given as $F=F1 \times (1-\Delta tc/Tb)$ until the tension F reaches the first degree F1. The length of the seat belt 2 and, thus, the tension F exerted on the seat belt 2 increases as the time $\Delta tc$ it takes the vehicle M2 may come into collision with the vehicle M1 in front decreases. Since the buckle 6 is started at a time determined by new information of relative speed $\Delta vc$ and distance Lc, it is possible to provide a fast response to a change of the relative speed $\Delta vc$ after the last stage of operation.

Figure 16:
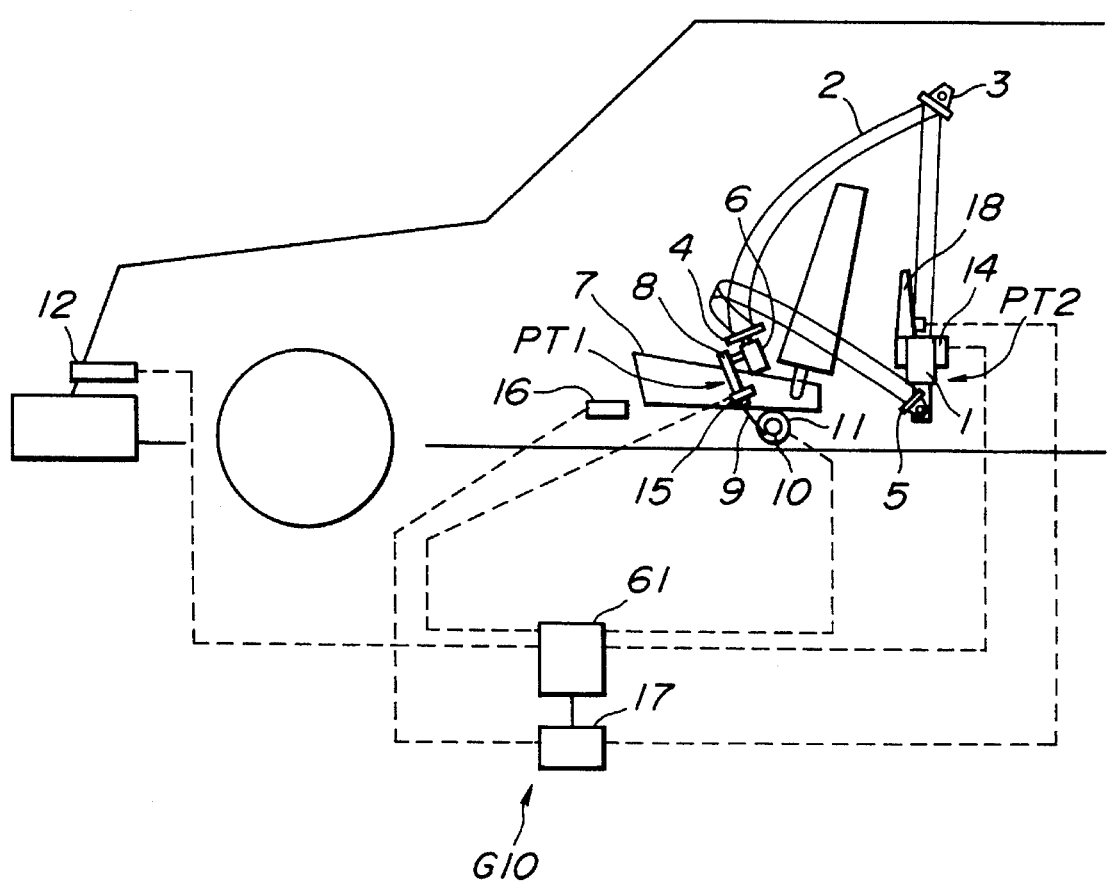
FIG. 16 is a schematic diagram showing a fifth embodiment of the passenger restraint belt system of the invention.

Referring to FIG. 16, there is shown a fifth embodiment of the passenger restraint belt system of the invention with the same elements being designated by the same reference numerals. The ultrasonic sensor 12 cannot be used to measure the distance Lc and the relative speed $\Delta vc$ when the distance Lc exceeds a predetermined value Lcx. If the relative speed $\Delta vcx$ is very high at the distance Lcx, the time $\Delta tcx (=Lcx/\Delta vcx)$ i t takes the vehicle M2 may come into collision with the vehicle M1 in front will be shorter than the time Tb (= Lbmax/vb1) required for the first preloader mechanism PT1 to retract the buckle 6 over its full stroke. In this embodiment, the first preloader mechanism PT1 is arranged to increase the belt retracting speed from vb1 to vb1x so as to place the seat belt 2 to the second occupant restraining position before a vehicle collision occurs. The first control circuit 61 calculates the time $\Delta tc$ it takes the vehicle ME may come into collision with the vehicle M1 in front at intervals of time. The first control circuit 61 produces a command signal to operate the first preloader mechanism PT1 so as to retract the seat belt 2 at the higher speed vb1x when the measured relative speed $\Delta vc$ increases in such a manner that the calculated time $\Delta tc$ is shorter than the time tb1 required for the first preloader mechanism PT1 to retract the buckle 6 at the speed vb1 over its full stroke.

Figure 17:
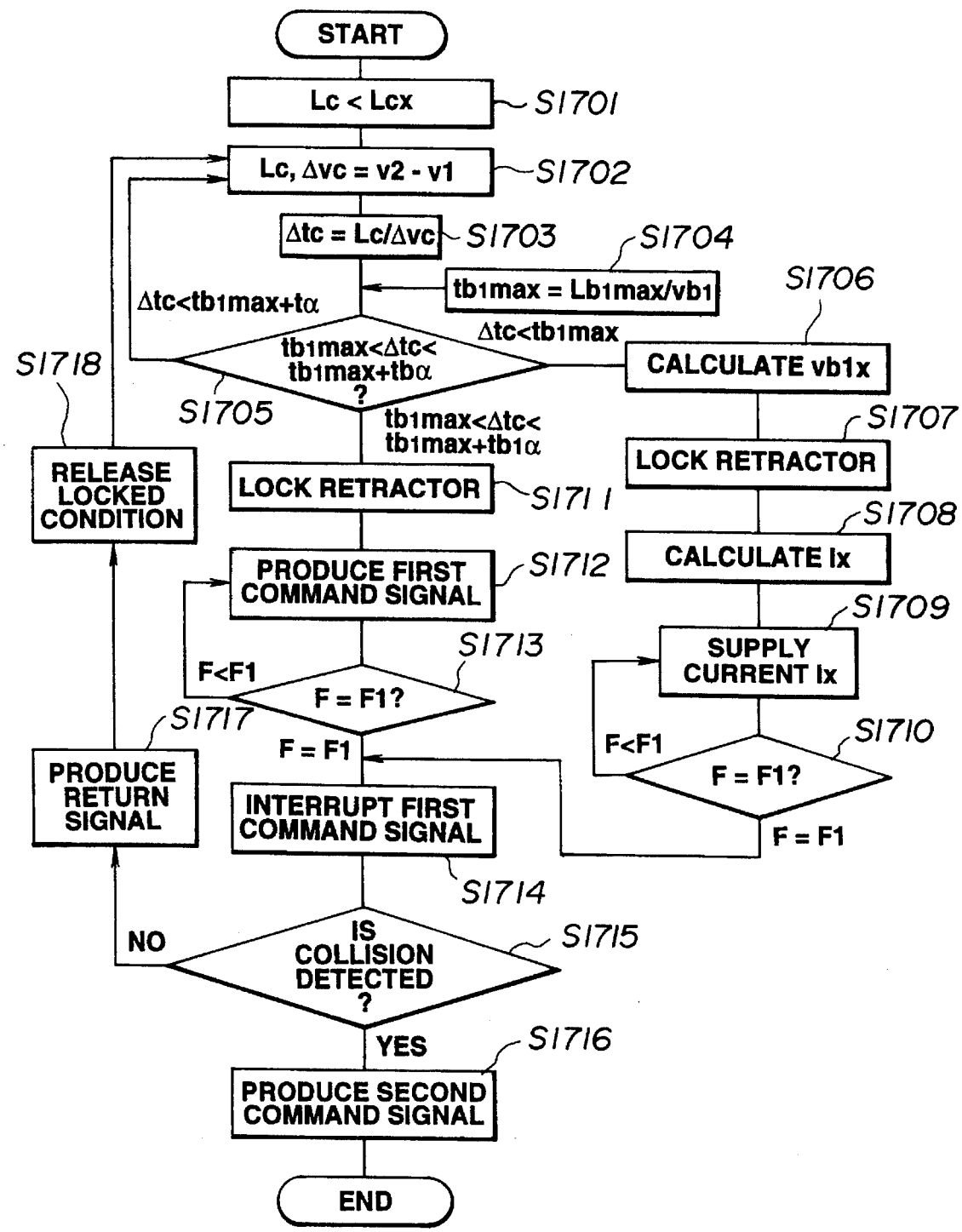
FIG. 17 is a flow diagram used in explaining the operation of the passenger restraint belt system of FIG. 16.
Figure 18:
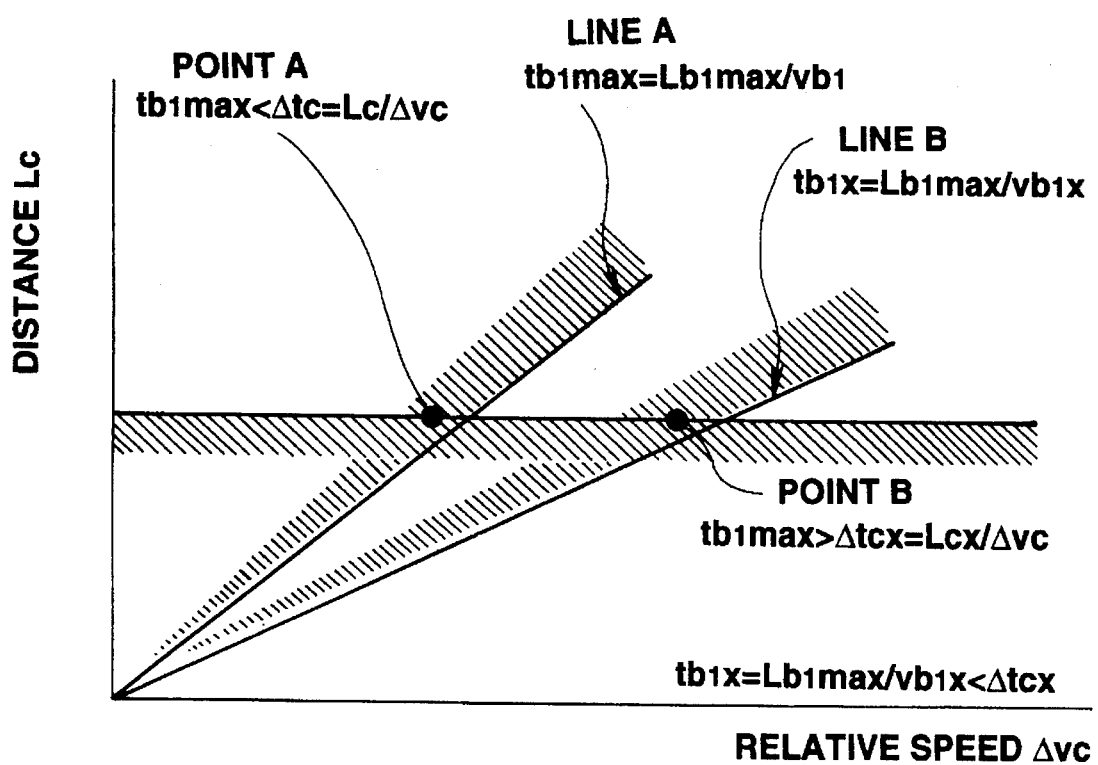
FIG. 18 is a graph used in explaining the operation of the passenger restraint belt system of FIG. 16.

Referring to FIG. 17, the operation of the fifth embodiment will be described further. At the step S1701, this operation starts when the distance Lc between the vehicle M2 and the vehicle M1 in front is less than the measurable value Lcx. At the step S1702, the distance Lc and the speed $\Delta vc$ of the vehicle M1 with respect to the vehicle M1 in front are measured. The relative speed Arc is given as $\Delta vc=v2-v1$ where v2 is the speed of travel of the vehicle M2 and v1 is the speed of travel of the vehicle M1 in front. The vehicle M2 may be a stopped vehicle or replaced with a fixed object. In this case, the speed v1 is zero. At the step S1703, the time $\Delta tc$ it takes the vehicle M2 may come into collision with the vehicle M1 in front is calculated as $\Delta tc=Lc/\Delta vc$. At the step S1704, the time tb1max required for the buckle 6 to be retracted over the full length or stroke is calculated based on the full stroke Lb1max of the buckle 6 and the speed vb1 at which the electric motor 11 rotates to retract the buckle 6. At the step S1705, a determination is made as to the calculated time $\Delta tc$ is greater than the time tb1max required for the first preloader mechanism PT1 to retract the buckle 6 over the full stroke and less than the time (tb1max+tb$\alpha$) where tb$\alpha$ indicates a short period of time. If $\Delta tc>(tb1max+tb\alpha)$, then the relative speed $\Delta vc$ and the distance Lc are calculated again at the step S1702. If $\Delta tc<tb1max$, then it means that the buckle 6 cannot be retracted over its full stroke when the motor speed is vb1 and a higher speed vb1x is calculated to satisfy the condition of Lb1max/vb1x<$\Delta tcx$ at the step S1706. At the step S1707, the first control circuit 61 produces a first command signal causing the belt clamping mechanism 14 to lock the retractor 1 so as to prevent the seat belt 2 from being pulled out further. At the step S1708, the current Ix required for the electric motor 11 to retract the seat belt 2 at the calculated speed vb1x is calculated. At the step S1709, the first control circuit 61 produces a command for supplying the current Ix to operate the electric motor 11 to retract the seat belt 2 at the speed vb1x. At the step S1710, a determination is made as to whether or not the tension exerted on the seat belt 2 reaches the first degree F1. If F<F1, then the electric motor 11 is held supplied with the current Ix to retract the seat belt 2. If F=F1, then the electric motor 11 is stopped at the step S1714.

If tb1max<$\Delta tc$<tb1max+tb$\alpha$, then the first control circuit 61 produces a first command signal causing the belt clamping mechanism 14 to lock the retractor 1 so as to prevent the seat belt 2 from being pulled out further at the step S1711. The first command signal is also applied, at the step S1712 to connect the power source to the electric motor 11 which thereby rotates to retract the seat belt 2 at the speed vb1. At the step S1713, a determination is made as to whether or not the tension F exerted on the seat belt 2 reaches the first degree F1. The tension F of the seat belt 2 is measured based on the sensor signal fed to the first control circuit 61 from the load cell 15. If the measured tension F is less than the first degree F1, then the electric motor 11 is held connected to the power source to retract the buckle 6 further at the step S1712. If the measured tension F reaches the first degree F1, then, at the step S1714, the first control circuit 61 interrupts the first command signal to disconnect the electric motor 11 from the power source. This terminates retraction of the seat belt 2 and holds the seat belt 2 in the second occupant restraining position.

At the step S1715, a determination is made as to whether or not a vehicle collision is detected in spite of the driver's operation for avoiding the vehicle collision. This determination is made based on an abrupt vehicle deceleration indicative signal fed from the G sensor 16 to the second control circuit 17. If the answer to this question is "yes", then the second control circuit 17 produces a second command signal, at the step S1716, to cause the explosive preloader 18 to retract the seat belt 2 in a moment from the second occupant restraining position to the third occupant restraining position so as to exert a second degree F2 of tension on the seat belt 2. If no abrupt vehicle deceleration indicative signal occurs after a sufficient time longer than the time $\Delta$ has elapsed, it means that the vehicle collision was avoided and the first control circuit 61 produces a return signal, at the step S1717, to reverse the direction of the electric motor 11 so as to return the buckle 6 to its initial position. At the step S1718, the first control circuit 61 produces a command to release the retractor locking condition of the belt clamping mechanism 14.

It is now assumed that, when the distance Lc between the vehicle M2 and the vehicle M1 in front comes into a measurable range below the value Lcx where the ultrasonic sensor 12 can be used for measurements of the distance Lc and the speed arc of the vehicle M2 with respect to the vehicle M1 in front, the relative speed $\Delta vc$ is in such a small value that the time $\Delta tc$ (=Lc/$\Delta vc$) it takes the vehicle M2 may come into collision with the vehicle M1 in front is longer than the time tb1max required for the first preloader mechanism PT1 to retract the buckle 6 over its full stroke, as indicated by the point A. In this case, the first preloader mechanism PT1 can complete retraction of the buckle 6 before the vehicle collision even though the seat belt 2 is retracted a t the speed vb1. If, when the distance Lc between the vehicle M2 and the vehicle M1 in front comes into the measurable range below the value Lcx, the relative speed $\Delta vc$ is in such a great value that the time $\Delta tc$ (= Lc/$\Delta vc$) it takes the vehicle M2 may come into collision with the vehicle M1 in front is shorter than the time tb1max required for the first preloader mechanism PT1 to retract the buckle 6 over its full stroke, as indicated by the point B, the first preloader mechanism PT1 cannot complete retraction of the buckle 6 before the vehicle collision when the seat belt 2 is retracted at the speed vb1. In this case, the seat belt retracting speed is increased from the value vb1 to the value vb1x.

Figure 19:
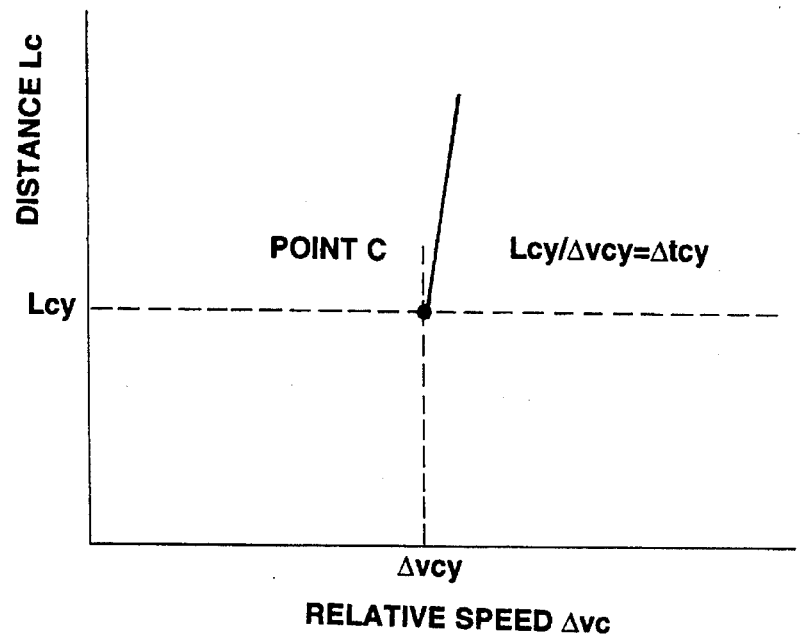
FIG. 19 is a graph used in explaining the operation of a modified form of the fifth embodiment of the invention.

Referring to FIG. 19, a modified form of the fifth embodiment of the invention will be described. In this modification, the first control circuit 61 is arranged to measure the distance Lc between the vehicle M2 and the vehicle M1 in front and the speed $\Delta vc$ of the vehicle M2 with respect to the vehicle M1 in front and calculates the time $\Delta tc$ it takes the vehicle M2 may come into collision with the vehicle M1 in front as $\Delta tc=Lc/\Delta vc$. The first control circuit 61 also measures the speed $\Delta vcy$ of the vehicle M2 with respect to the vehicle M1 in front when the distance Lc comes into the measurable range below a distance Lcy. The first control circuit 61 calculates the time $\Delta tcy$ it takes the vehicle M2 may come into collision with the vehicle M1 in front as $\Delta tcy=Lcy/\Delta vcy$. The first control circuit 61 calculates a current Iy to realize a seat belt retracting speed vb1y satisfying vb1y>Lb1/$\Delta tcy$ from a relationship of Lb1/vb1y where Lb1 is the full stroke of the buckle 6. The current applied to the electric motor 11 is controlled to the calculated value Iy.

Figure 20:
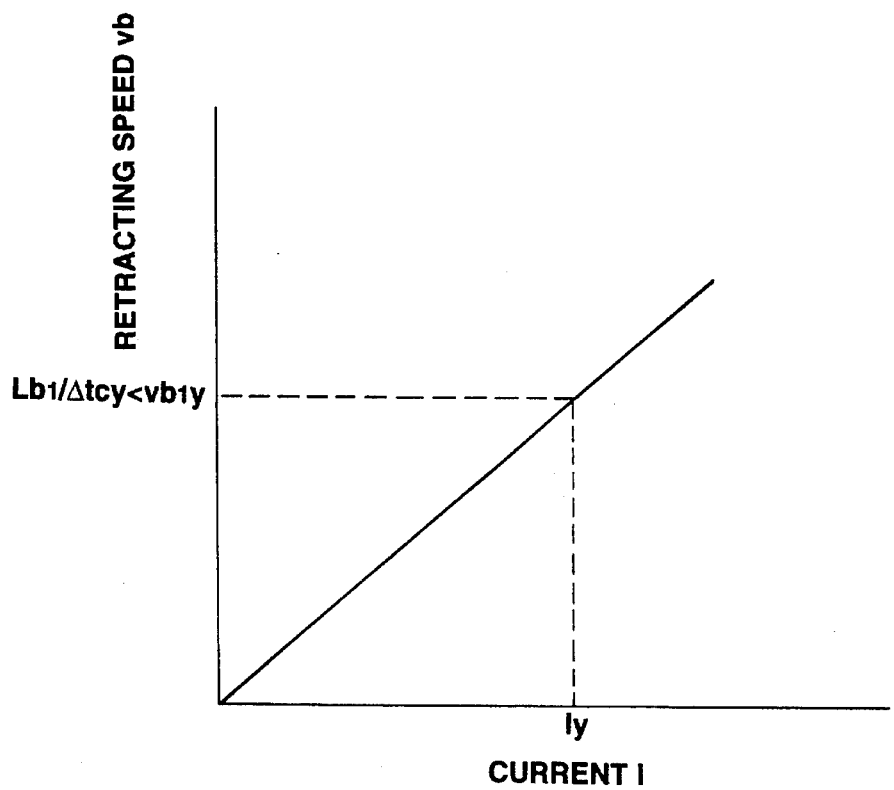
FIG. 20 is a graph showing the relationship between the current supplied to the electric motor and the speed at which the seat belt is retracted.

When the distance Lc comes into the measurable range below the value Lcy, as indicated by the point C, the relative speed $\Delta vcy$ is measured. The speed vb1y at which the electric motor 11 rotates to retract the buckle 6 is calculated from the relationship Lb1/vb1y<$\Delta tcy$ to satisfy the condition of vb1y>Lb1/$\Delta tcy$ so that the buckle 6 can be retracted over its full stroke within the calculated time $\Delta tcy$. The current Iy required for the electric motor 11 to operate to retract the seat belt 2 at the speed vb1y is calculated from the relationship of FIG. 20. The electric motor 11 is controlled to operate at the calculated speed vb1y. In this modification, the distance Lc and the relative speed $\Delta vc$ are measured once only when the distance Lc is equal to the predetermined value Lcy.

Figure 21A:
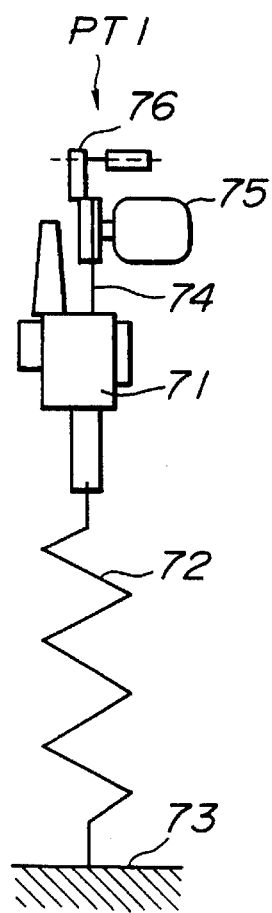
FIGS. 21A, 21B and 21C are schematic diagram showing a modified form of the first preloader mechanism.
Figure 21B:
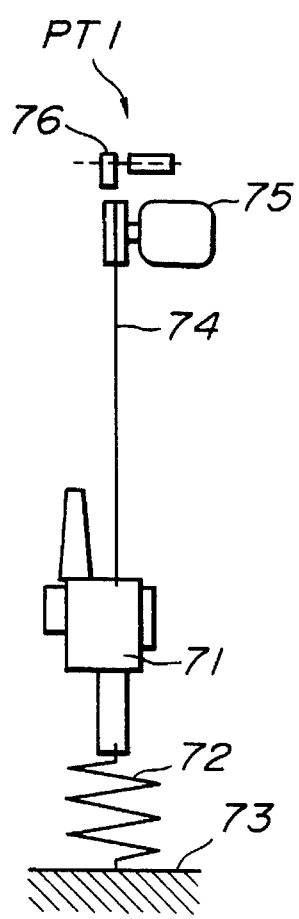
Figure 21C:
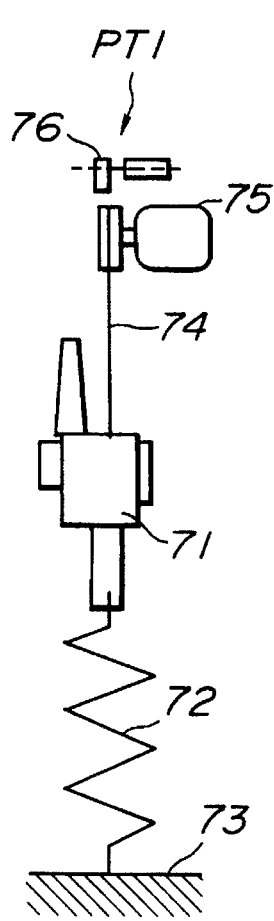

Referring to FIGS. 21A to 21C, a modified form of the first preloader mechanism PT1 is shown. In this modification, the first preloader mechanism PT1 includes a wire 74 coupled to the upper end of a retractor 71 whose lower end is coupled to the vehicle body through a tension spring 72. The wire 74 is looped around a pulley driven by an electric motor 75 fixed on the vehicle body. A lock mechanism 76 is provided to lock the pulley.

When a vehicle collision is anticipated, the control unit G10 produces a command signal operating the electric motor 75 to retract the wire 74. As a result, the retractor 71 moves upward while extending the tension spring 72. When the tension exerted on the tension spring 72 reaches a first degree F1, the control unit G10 stops the electric motor 75 to terminate retraction of the wire 74 and operates the lock mechanism 76 to hold the retractor 71 at the existing position, as shown in FIG. 21A. When a great danger of a vehicle collision exists, the lock mechanism 76 is released. This allows the tension spring 72 to pull the seat belt under the first degree F1 of tension, as shown in FIG. 21B, so as to absorb the slack before the vehicle collision. When the vehicle collision is avoided, the first control unit G10 produces a command signal causing the electric motor 75 to move the retractor 71 while extending the tension spring 72, as shown in FIG. 21C. The lock mechanism 76 is operated to hold the retractor 71 at the existing position.

In this modification, the electric motor 75 can move the retractor at a slow speed until the next danger of vehicle collision exists after the vehicle collision is avoided. This is effective to eliminate the need for the use of a strong and high-speed electric motor.

Figure 22:
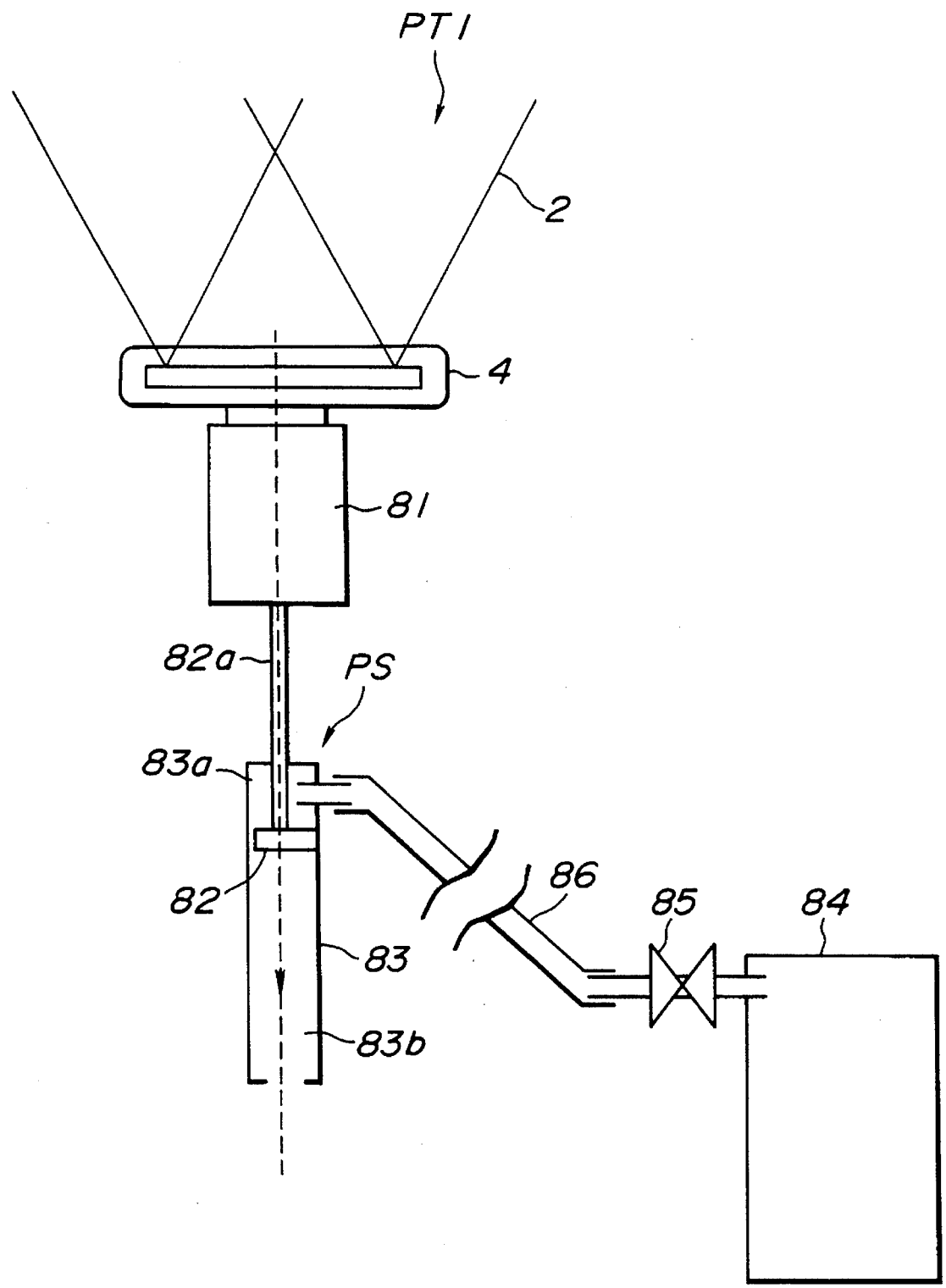
FIG. 22 is a schematic diagram showing another modified form of the first preloader mechanism.

Referring to FIG. 22, another modified form of the first preloader mechanism PT1 is shown. In this modification, the first preloader mechanism PT1 includes a piston/cylinder unit PS having a cylinder 83 mounted on the vehicle body and a piston 82 placed for reciprocation within the cylinder 83. The piston 82 divides the cylinder 83 into first and second chambers 83a and 83b on the opposite sides thereof. The first chamber 83a is connected to a pressure source (compressor 84) through a conduit 86 having a control valve 85. The second chamber 84 is connected to the atmosphere. The piston 82 has a piston rod 82a coupled to a buckle 81 for receipt of a tongue 4 having an aperture through which the seat belt 2 is looped.

The control unit G10 produces a command signal to open the control valve 85 so as to introduce a pressure from the compressor 84 into the first chamber 83a when a vehicle collision is anticipated. As a result, the piston 82 moves downward to retract the buckle 81 so as to absorb the slack in the seat belt 2.

The control unit G10 may be arranged to produce a first command signal at intervals of time to operate the first preloader mechanism PT1 so as to increase the tension F exerted on the seat belt 2 to the first degree F1 in a plurality of stages during a period of time $\Delta tc$ it takes the vehicle M2 may come in to collision with the vehicle M1 in front, as described in connection with the third embodiment.

Figure 23:
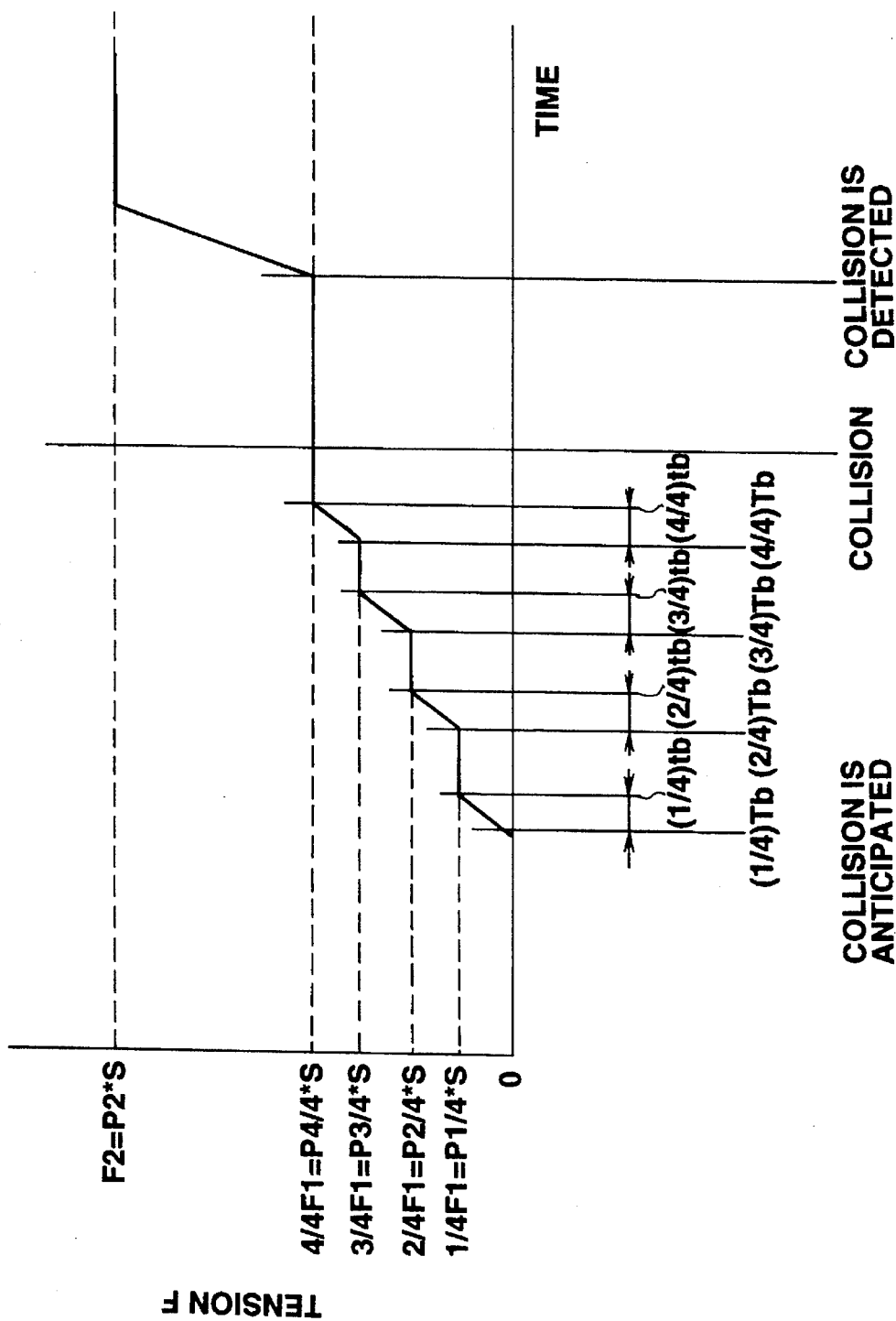
FIG. 23 is a graph showing variations in the tension F exerted on the seat belt with the lapse of time.

FIG. 23 shows variations in the tension F exerted on seat belt 2 with the lapse of time when the first preloader mechanism PT1 operates to increase the tension F exerted on the seat belt 2 in four stages during the period of time $\Delta tc$. At the first stage of operation, the time $\Delta tc$ it takes the vehicle M2 may come into collision with the vehicle M1 in front is calculated. When the calculated time $\Delta tc$ reaches the time $(1/4) \cdot Tb$ required for the first preloader mechanism PT1 to retract the full stroke of the buckle 81, the control valve 84 opens to retracts the buckle 81 from its initial position to the first stop position so as to exert one-fourth of the first degree F1 of tension on the seat belt 2 at a time $(1/4) \cdot tb$. That is, the control valve 84 opens so as to introduce a pressure P1 into the first chamber 83a. The pressure P1 is given as $P1=F1/(4 \times S)$ where S is the area of the piston 82. The buckle 81 is held at the first stop position where the tension F1/4 exerted on the seat belt 2 and the force acting on the piston 82 are balanced upon completion of the first stage of operation. At the second stage of operation, the time $\Delta$ it takes the vehicle M2 may come into collision with the vehicle M1 in front is calculated again. When the calculated time $\Delta tc$ reaches the time $(2/4) \cdot Tb$ required for the first preloader mechanism PT1 to retract the remaining stroke of the buckle 81 from the first stop position, the first preloader mechanism PT1 operates to retract the buckle 81 from the first stop position to the second stop position so as to exert two-fourth of the first degree F1 of tension on the seat belt 2 at a time $(2/4) \cdot tb$. That is, the control valve 84 opens further so as to introduce a pressure P2 into the first chamber 83a. The pressure P2 is given as $P2=2 \times F1/(4 \times S)$ where S is the area of the piston 82. The buckle 81 is held at the first stop position where the tension $F1 \times 2/4$ exerted on the seat belt 2 and the force acting on the piston 82 are balanced upon completion of the second stage of operation. The buckle 81 is held at the second stop position upon completion of the second stage of operation. Upon completion of the second stage of operation, similar steps are repeated. When the fourth stage of operation is completed, the tension F exerted on the seat belt 2 reaches the first degree F1. The length of the seat belt 2 and, thus, the tension exerted on the seat belt 2 increases as the time $\Delta tc$ it takes the vehicle M2 may come into collision with the vehicle M1 in front decreases. Even if the buckle 81 is not retracted over its full stroke because of an abrupt increase of the relative speed $\Delta vc$ when a vehicle collision occurs, a great degree of tension will be exerted on the seat belt 2 to provide a good occupant restraining condition. Since retraction of the buckle 81 is started at a time determined by new information of relative speed $\Delta vc$ and distance Lc, it is possible to provide a fast response to a change of the relative speed $\Delta vc$ after the last stage of operation. In addition, the buckle 81 is stopped automatically at a position in which the tension exerted on the seat belt 2 and the force acting on the piston 82 are balanced. This is effective to simplify the control unit G10.

Figure 24:
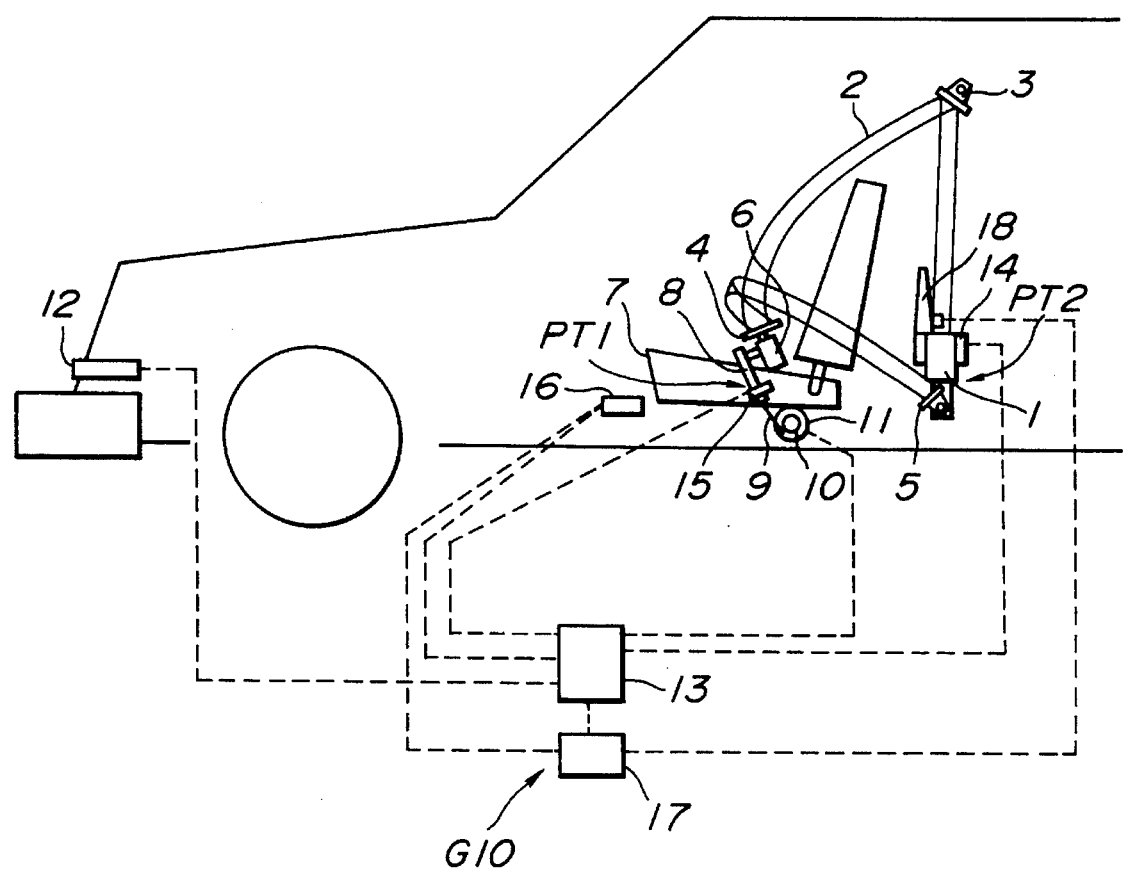
FIG. 24 is a schematic diagram showing a sixth embodiment of the passenger restraint belt system of the invention.

Referring to FIG. 24, there is shown a sixth embodiment of the passenger restraint belt system of the invention with the same elements being designated by the same reference numerals. In this embodiment, the second control circuit 17 is connected to the G sensor 16 and measures the vehicle deceleration Gc produced in the presence of vehicle braking. The measured vehicle deceleration Gc is used, along with the measured distance Lc and relative speed $\Delta vc$, to calculate the time $\Delta tcb$ it takes the vehicle M2 may come into collision with the vehicle M1 in front.

Figure 25:
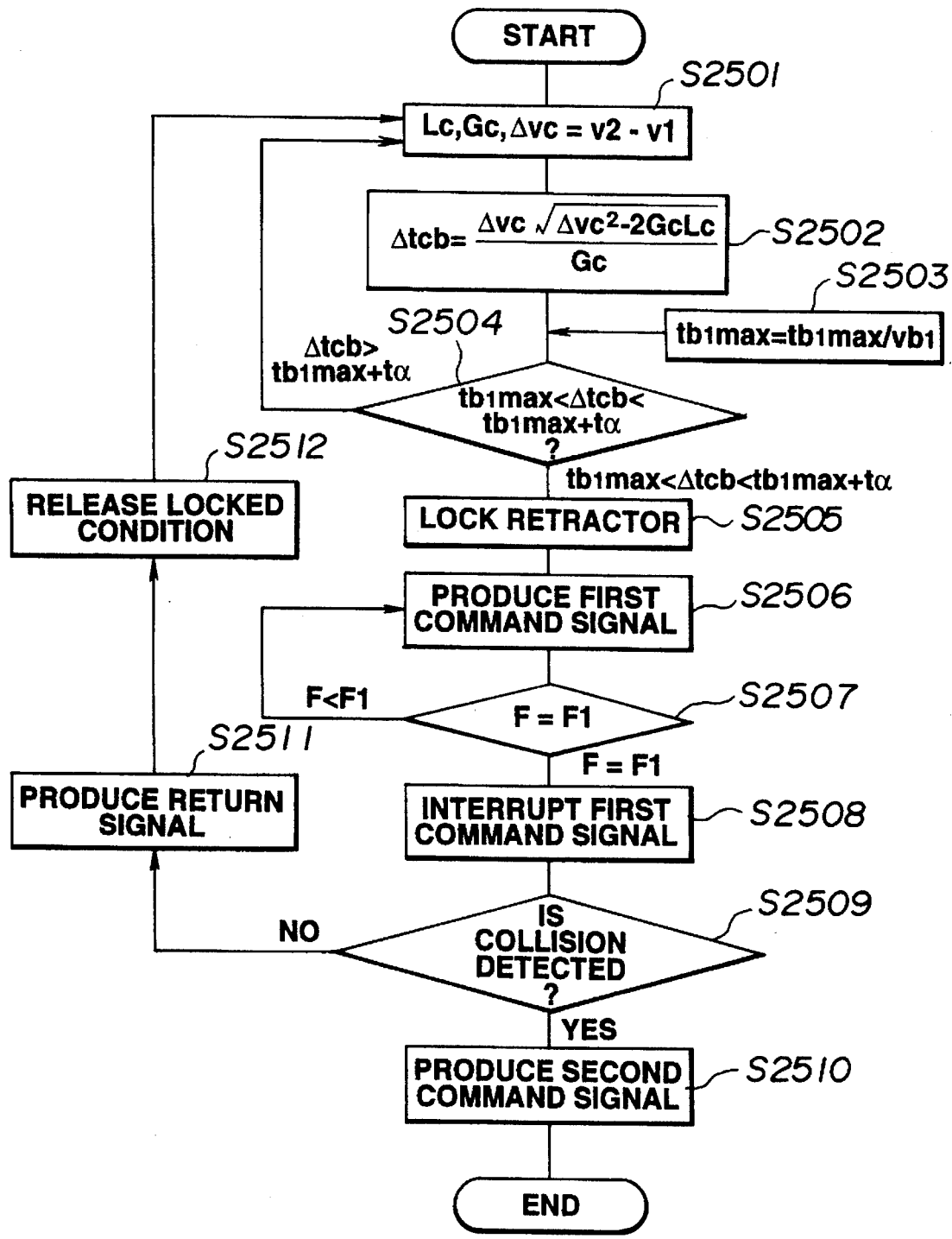
FIG. 25 is a flow diagram used in explaining the operation of the passenger restraint belt system of FIG. 24.
Figure 26:
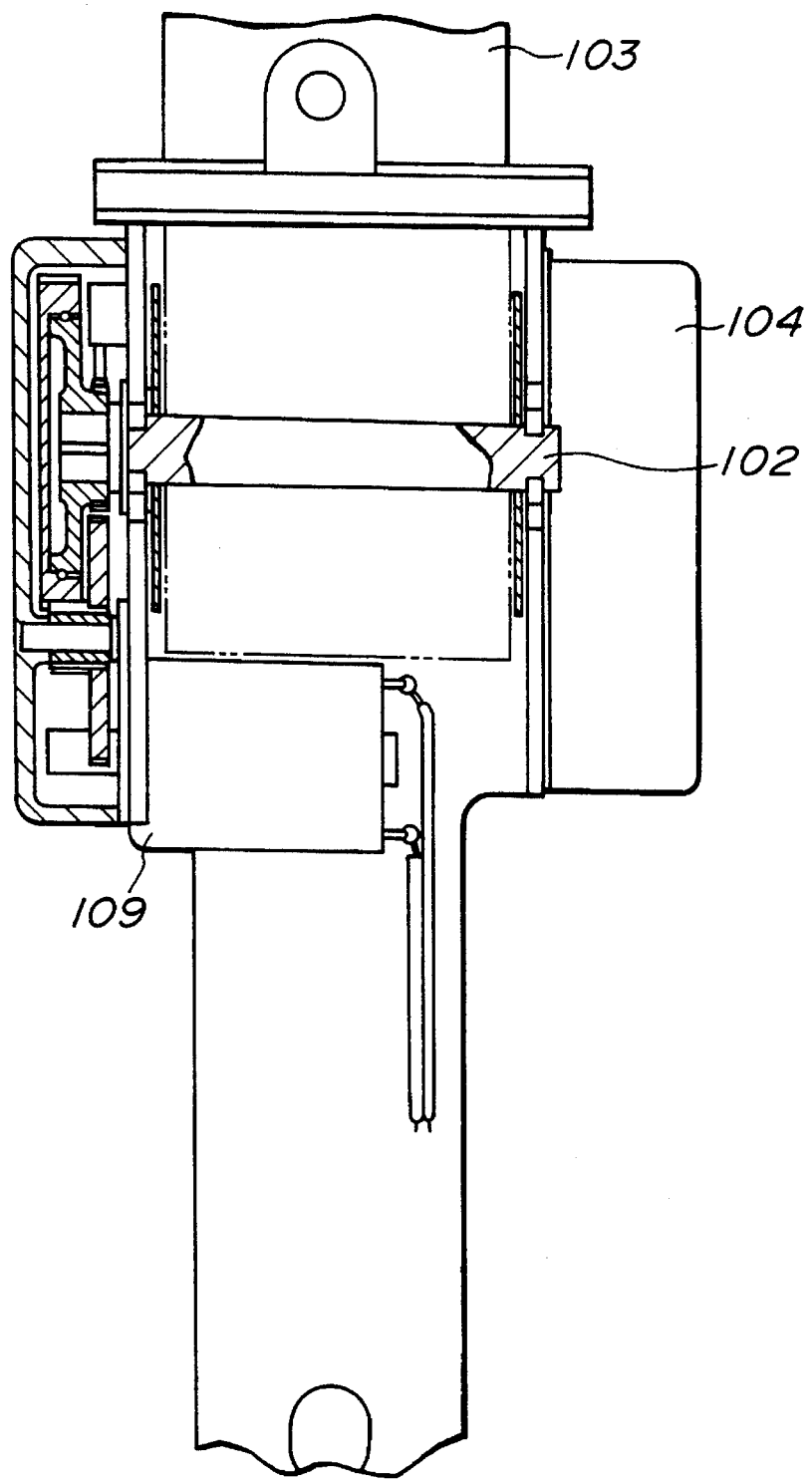
FIG. 26 is a sectional view showing a retractor used in a conventional vehicle occupant restraint belt system.
Figure 27:
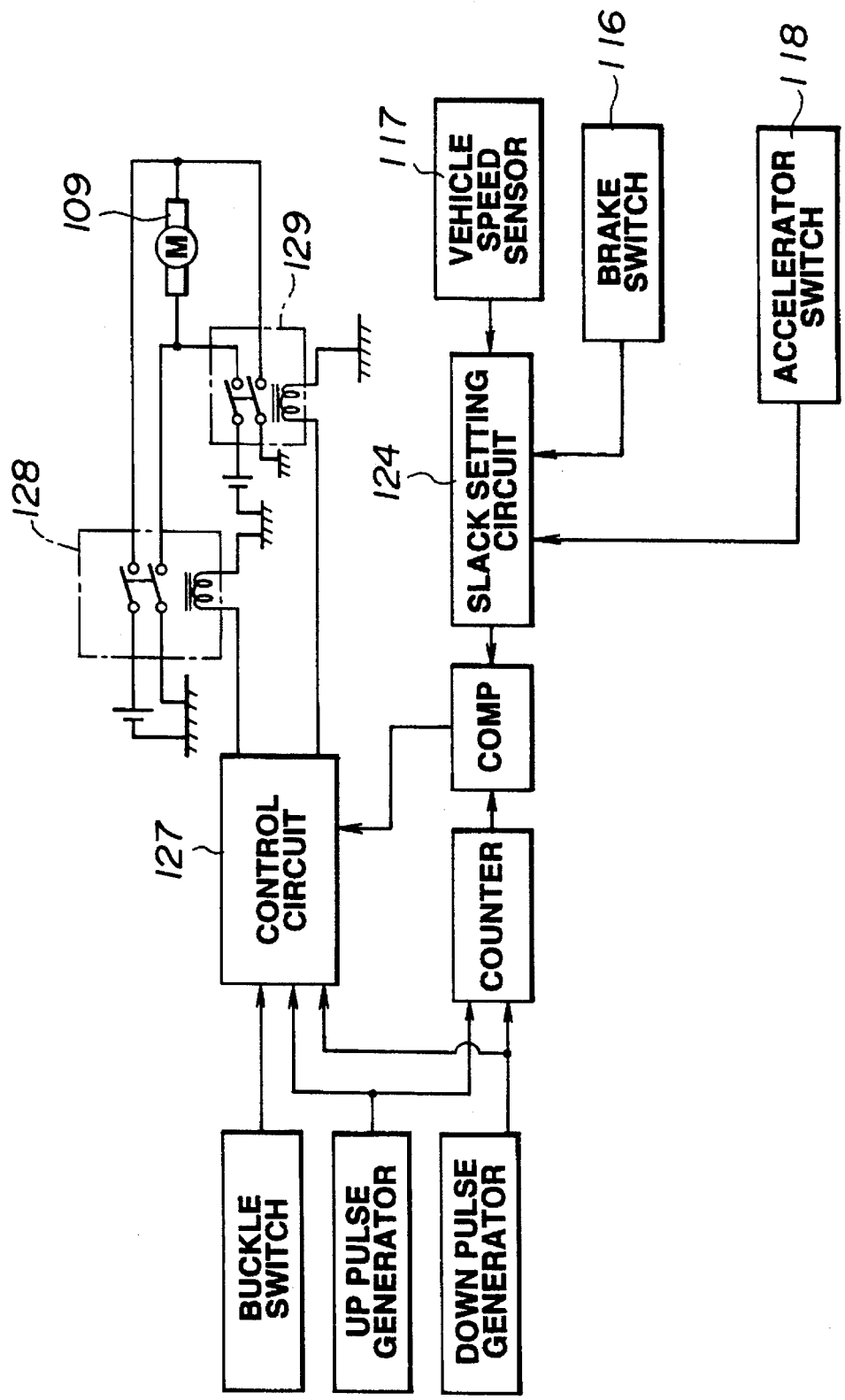
FIG. 27 is a block diagram showing a control unit used with the vehicle occupant restraint belt system of FIG. 26.
Figure 28:
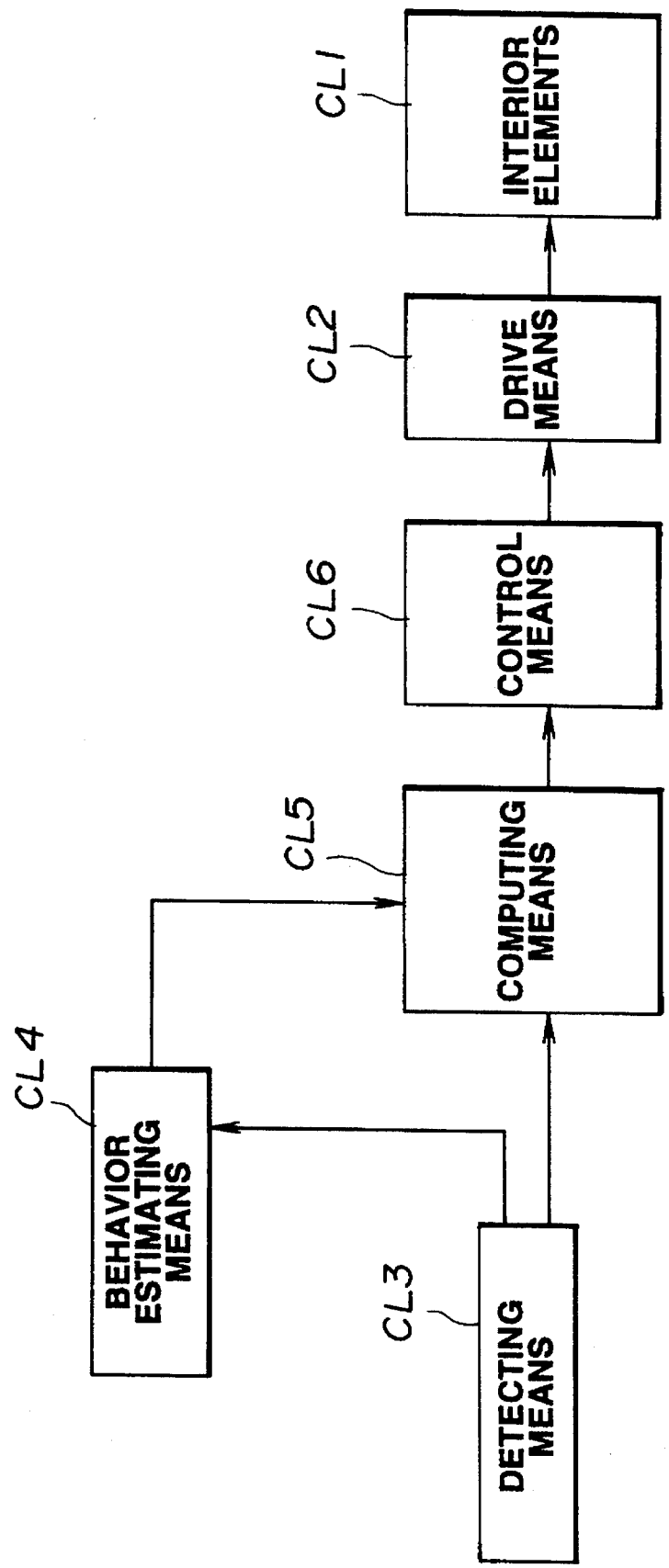
FIG. 28 is a block diagram showing another conventional vehicle occupant restraint belt system.
Figure 29A:
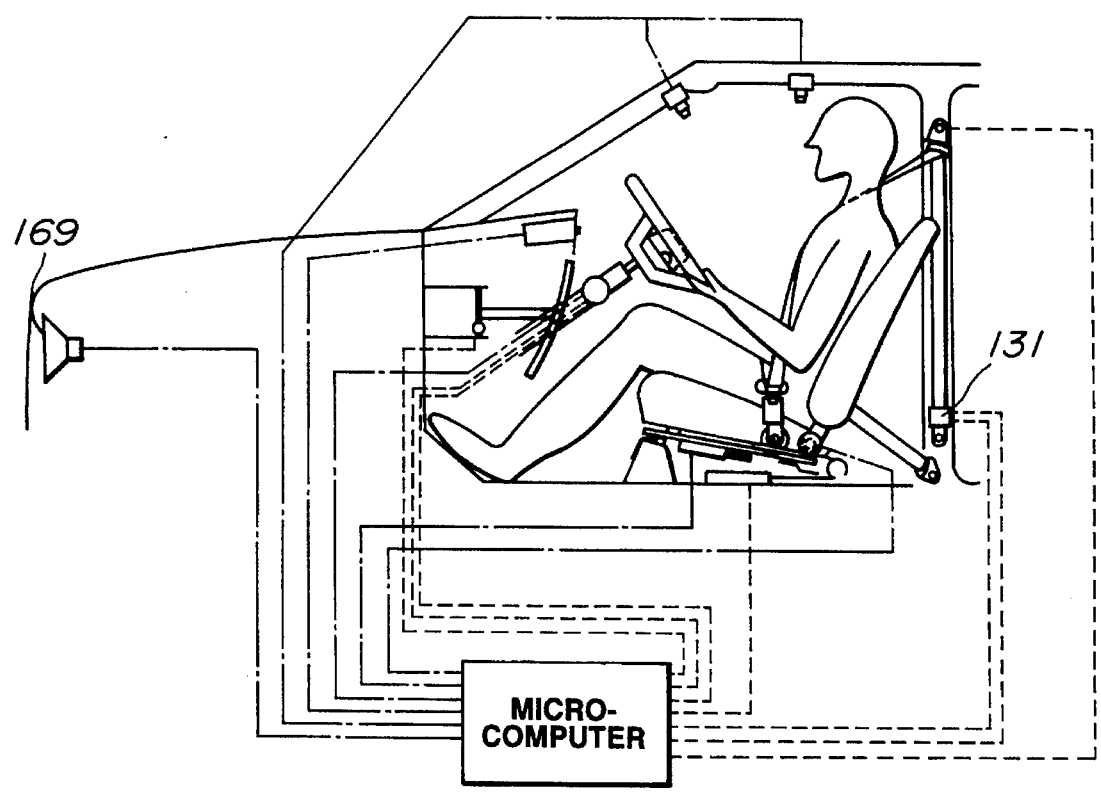
FIG. 29A is a schema tic diagram showing the vehicle occupant restraint belt system of FIG. 28.
Figure 29B:
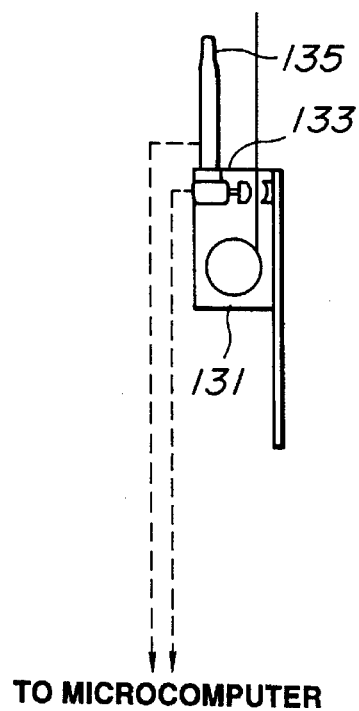
FIG. 29B is an enlarged view showing the significant portion of the vehicle occupant restraint belt system of FIG. 28.
Figure 30:
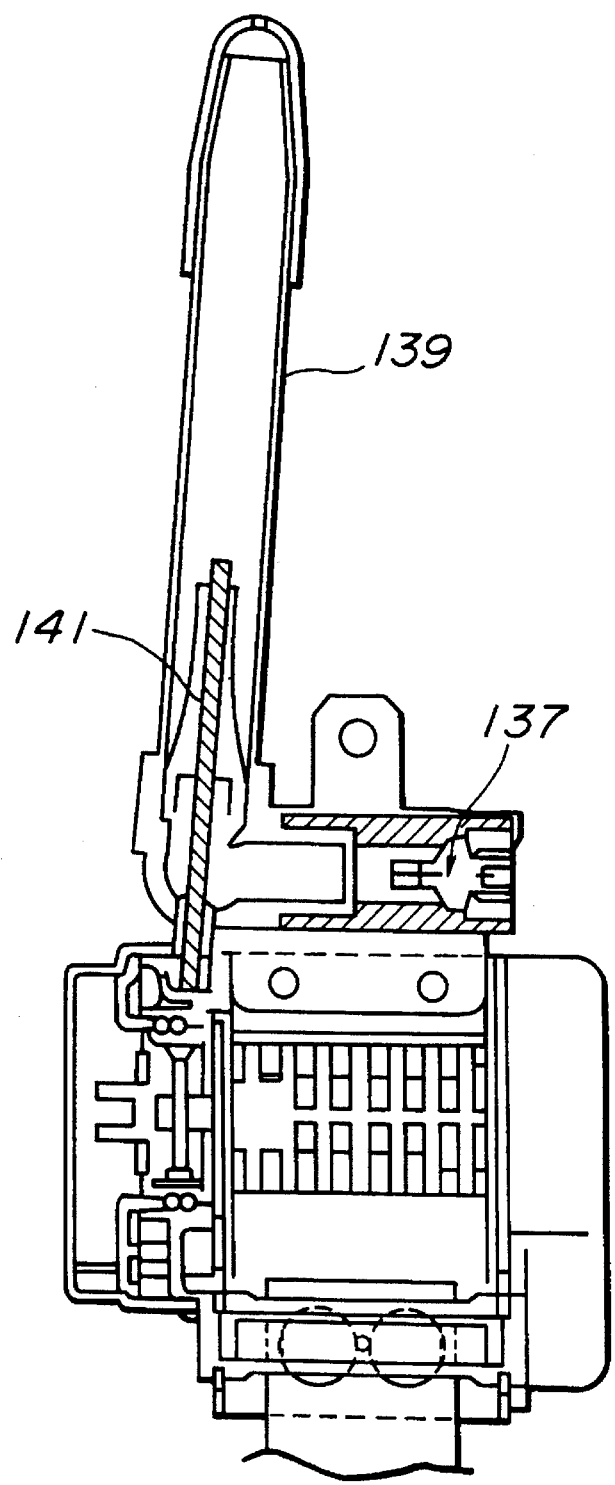
FIG. 30 is a sectional view showing still another conventional vehicle occupant restraint belt system.

Referring to FIG. 25, the operation of the sixth embodiment of the invention will be described. At the step S2501, the distance Lc between the vehicle M2 and the vehicle M1 in front, the speed $\Delta vc$ of the vehicle M1 with respect to the vehicle M1 in front, and the vehicle deceleration Gc produced in the presence of vehicle braking are measured. At the step S2502, the time $\Delta tcb$ it takes the vehicle M2 may come in to collision with the vehicle M1 in front is calculated. The time $\Delta tcb$ is given as $$\Delta tcb = \frac{\Delta vc - \sqrt{\Delta vc^2 - 2Gc \cdot Lc}}{Gc}$$

At the step S253, the time tb1max required for the buckle 6 to be retracted over the full length or stroke is calculated based on the full stroke Lb1max of the buckle 6 and the speed vb1 at which the electric motor 11 rotates to retract the buckle 6. At the step S2504, a determination is made as to whether the calculated time Δtcb is greater than the time tb1max required for the first preloader mechanism PT1 to retract the buckle 6 over the full stroke and less than the time (tb1max+tbα) where tbα is a predetermined short period of time. If Δtc>tb1max+tbα, the relative speed Δvc and the distance Lc are calculated again at the step S2501. If tb1max<Δtcb<tb1max+tbα, then it means that there is a great degree of danger of the vehicle M2 coming into collision with the vehicle M1 in front and, at the step S2505, the first control circuit 13 produces a first command signal causing the belt clamping mechanism 14 to lock the retractor 1 so as to prevent the seat belt 2 from being pulled out further. The first command signal is also applied to connect the power source to the electric motor 11 which thereby rotates to retract the buckle 6 at the step S2506.

At the step S2507, a determination is made as to whether or not the tension F exerted on the seat belt 2 reaches the first degree F1. The tension F of the seat belt 2 is measured based on the sensor signal fed to the first control circuit 13 from the load cell 15. If the measured tension F reaches the first degree F1, then it means that the seat belt 2 has been placed in the second occupant restraining position and, at the step S2508, the first control circuit 13 interrupts the first command signal so as to terminates retraction of the seat belt 2. Otherwise, the electric motor 11 is held connected to the power source to retract the buckle 6 at the step S2506.

At the step S2509, a determination is made as to whether or not a vehicle collision is detected in spite of the driver's operation for avoiding the vehicle collision. This determination is made based on an abrupt vehicle deceleration indicative signal fed from the G sensor 16 to the second control circuit 17. If the answer to this question is "yes", then the second control circuit 17 produces the second command signal, at the step S2510, to cause the second preloader mechanism PT2 (explosive preloader 18) to retract the seat belt 2 in a moment from the second occupant restraining position to the third occupant restraining position where the second degree F2 of tension is exerted on the seat belt 2. If no abrupt vehicle deceleration indicative signal occurs after a sufficient time longer than the time Δtc has elapsed, it means that the vehicle collision was avoided and the first control circuit 13 produces the return signal, at the step S2511, to reverse the direction of the electric motor 11. As a result, the buckle 6 is returned to its initial position where the seat belt 2 is placed in the first or normal occupant restraining position. At the step S2512, the first control circuit 13 causes the belt clamping mechanism 14 to release its retractor locking condition.

The control unit G10 of FIG. 1 is arranged to calculate the time Δtc it takes the vehicle M2 may come into collision with the vehicle M1 in front in such a manner that the first preloader mechanism PT1 can complete retraction of the full stroke of the buckle 6 to exert a first degree F1 of tension on the seat belt 2 before the vehicle collision even if the driver dozes while driving in the absence of vehicle braking. Normally, the driver applies the brake to the vehicle to decrease the relative speed Δvc when he or she feels a danger of vehicle collision. In this embodiment, the vehicle deceleration Gc is used to calculate the time Δtcb it takes the vehicle M2 may come into collision with the vehicle M1 in front. This is effective to reduce the frequency at which the first preloader mechanism PT1 operates.

Although the invention has been described in connection with passenger restraint belt systems, it is to be understood that the invention could be equally applicable to restraint belt systems used in ships, airplanes and other conveyances.

What is claimed is:

1. A passenger restraint belt system for use with a seat installed in a conveyance, comprising:
    a seat belt for restraining a passenger on the seat in a first restraint position;
    a first preloader mechanism responsive to a first command signal for retracting the seat belt from the first restraint position to a second restraint position where a first degree of tension is exerted on the seat belt so as to restrain the seat passenger while allowing passenger's operations to avoid a vehicle collision;
    a second preloader mechanism responsive to a second command signal for retracting the seat belt from the second restraint position to a third restraint position where a second, greater degree of tension is exerted on the seat belt so as to restrain the seat passenger against impacts caused by the vehicle collision; and
    a control unit for producing the first command signal to the first preloader mechanism when the vehicle collision is anticipated and the second command signal to the second preloader mechanism when the vehicle collision is detected.

2. The passenger restraint belt system as claimed in claim 1, wherein the control unit includes means for measuring a distance Lc of the conveyance with respect to an object and a speed Δvc of the conveyance with respect to the object, means for calculating a time Δtc it takes until the conveyance comes into collision with the object as Δtc=Lc/Δvc, and means for producing the first command signal when a time tb1 required for the first preloader mechanism to retract the seat belt from the first restraint position to the second restraint position is less than the calculated time Δtc.

3. The passenger restraint belt system as claimed in claim 2, wherein the control unit includes means for calculating the time tb1 as tb1=Lb1/vb1 where Lb1 is a length of the seat belt retracted from the first restraint position to the second restraint position, and vb1 is a speed of the first preloader mechanism to retract the seat belt.

4. The passenger restraint belt system as claimed in claim 3, wherein the control unit includes means for measuring the length Lb1 while operating the first preloader mechanism to retract the seat belt from the first restraint position to the second restraint position.

5. The passenger restraint belt system as claimed in claim 1, wherein the first preloader mechanism operates to return the seat belt from the second restraint position to the first restraint position in response to a return signal, and wherein the control unit includes means for producing the return signal to the first preloader mechanism when the vehicle collision is avoided.

6. The passenger restraint belt system as claimed in claim 1, wherein the second preloader mechanism includes an explosive preloader operable in response to the second command signal to produce a great force so as to retract a predetermined length of the seat belt in a moment.

7. The passenger restraint belt system as claimed in claim 1, wherein the control unit includes means for measuring a tension exerted on the seat belt, a control means operable for measuring a distance Lc of the conveyance with respect to an object and a speed Δvc of the conveyance with respect to the object, calculating a time Δtc it takes until the conveyance comes into collision with the object as Δtc=Lc/Δvc, producing the first command signal when a time tb1 required for the first preloader mechanism to retract the seat belt to the second restraint position is less than the calculated time Δtc, and interrupting the first command signal to stop the first preloader mechanism when the measured tension reaches a predetermined degree less than a first degree F1, and means for continuously operating the control means at intervals of time while increasing the predetermined degree.

8. The passenger restraint belt system as claimed in claim 7, wherein the control unit includes means for operating the control means in a predetermined number N of cycles to bring the seat belt to the second restraint position, and means for setting the predetermined degree at a value F1/N greater than that used in the last cycle of operation of the control means.

9. The passenger restraint belt system as claimed in claim 1, wherein the control unit includes means for measuring a tension exerted on the seat belt, a control means operable for measuring a distance Lc of the conveyance with respect to an object and a speed Δvc of the conveyance with respect to the object, calculating a time Δtc it takes until the conveyance comes into collision with the object as Δtc=Lc/Δvc, producing the first command signal when the calculated time Δtc reaches a time tb1 required for the first preloader mechanism to retract the seat belt to the second restraint position, and interrupting the first command signal to stop the first preloader mechanism when the measured tension reaches a degree given as (1−Δtc/tb1), and means for continuously operating the control means at intervals of time to bring the seat belt to the second restraint position.

10. The passenger restraint belt system as claimed in claim 1, wherein the first preloader mechanism is operable to retract the seat belt at a first speed vb1 in response to the first command signal, and to retract the seat belt at a second, higher speed vbx in response to a third command signal, and wherein the control unit includes means for measuring a distance Lc of the conveyance with respect to an object and a speed Δvc of the conveyance with respect to the object, means for calculating a time Δtc it takes until the conveyance comes into collision with the object as Δtc=Lc/Δvc, means for producing the third command signal to the first preloader mechanism when the calculated time Δtc is shorter than a time tb1 required for the first preloader mechanism to retract the seat belt to the second restraint position.

11. The passenger restraint belt system as claimed in claim 1, wherein the control unit includes means for measuring a distance Lc of the conveyance with respect to an object and a speed Δvc of the conveyance with respect to the object when the measured distance Lc fails to reach a maximum measurable value Lcy, means for calculating a time Δtc it takes until the conveyance comes into collision with the object as Δtc=Lc/Δvc, means for measuring a speed Δvcy of the conveyance with respect to the object after reducing the measured distance Lc when the measured distance Lc reaches the maximum measurable value Lcy, means for calculating a time Δtcy it takes until the conveyance comes into collision with the object as Δtcy=Lcy/Δvcy, and means for supplying a current Iy to the first preloader mechanism so as to retract the seat belt at a speed vb1y satisfying a condition of vb1y>Lb1/Δtcy where Lb1 is a length of the seat belt the first preloader mechanism retracts from the first restraint position to the second restraint position.

12. The passenger restraint belt system as claimed in claim 1, wherein the first preloader mechanism includes an emergency lock retractor having a lower end connected to a vehicle body through a tension spring and an upper end connected to a wire looped around a pulley, an electric motor for driving the pulley to retract the wire so as to exert a tension on the tension spring, and a lock mechanism operable for positioning the re tractor when the exerted tension reaches a predetermined degree, and wherein the control unit includes means responsive to the first command signal for releasing the lock mechanism, and responsive to the return signal for operating the electric motor to retract the wire.

13. The passenger restraint belt system as claimed in claim 1, wherein the seat belt is looped through an aperture formed in a tongue, and wherein the first preloader mechanism is associated with a buckle provided for receipt of the tongue so as to connect the first preloader mechanism to the seat belt, the first preloader mechanism including an actuator responsive to a fluid pressure for retracting the buckle so as to retract the seat belt from the first restraint position to the second restraint position, and means responsive to the first command signal for applying the fluid pressure to the actuator.

14. The passenger restraint belt system as claimed in claim 13, wherein the actuator includes a cylinder fixed to a conveyance body and a piston provided for reciprocation within the cylinder, the piston being connected to the buckle, and means for introducing the fluid pressure into the cylinder to move the piston in a direction retracting the buckle toward the conveyance body.

15. The passenger restraint belt system as claimed in claim 13, wherein the control unit includes means for measuring a tension exerted on the seat belt, a control means operable for measuring a distance Lc of the conveyance with respect to an object and a speed Δvc of the conveyance with respect to the object, calculating a time Δtc it takes until the conveyance comes into collision with the object as Δtc=Lc/Δvc, producing the first command signal when a time tb1 required for the first preloader mechanism to retract the seat belt to the second restraint position is less than the calculated time Δtc, and interrupting the first command signal to stop the first preloader mechanism when the measured tension reaches a predetermined degree less than a first degree F1, and means for continuously operating the control means at intervals of time while increasing the predetermined degree.

16. The passenger restraint belt system as claimed in claim 15, wherein the control unit includes means for operating the control means in a predetermined number N of cycles to bring the seat belt to the second restraint position, and means for setting the predetermined degree at a value F1/N greater than that used in the last cycle of operation of the control means.

17. The passenger restraint belt system as claimed in claim 1, wherein the control unit includes means for measuring a distance Lc of the conveyance with respect to an object, a speed Δvc of the conveyance with respect to the object, and a deceleration Gc of the conveyance, means for calculating a time Δtcb it takes until the conveyance comes into collision with the object as $$\Delta tcb = \frac{\Delta vc \sqrt{\Delta vc^2 - 2Gc \cdot Lc}}{Gc}$$

means for producing the first command signal when a time tb1 required for the first preloader mechanism to retract the seat belt from the first restraint position to the second restraint position is less than the calculated time Δtcb.

18. The passenger restraint belt system as claimed in claim 17, wherein the control unit includes means for calculating the time tb1 as tb1=Lb1/vb1 where Lb1 is a length of the seat belt retracted from the first restraint position to the second restraint position, and vb1 is a speed of the first preloader mechanism to retract the seat belt.

19. The passenger restraint belt system as claimed in claim 18, wherein the control unit includes means for measuring the length Lb1 while operating the first preloader mechanism to retract the seat belt from the first restraint position to the second restraint position.

* * * * *